United States Patent
Abellera

(10) Patent No.: US 6,683,626 B1
(45) Date of Patent: Jan. 27, 2004

(54) FOCUS-BASED SCROLLING

(75) Inventor: Suzanne L. Abellera, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 401 days.

(21) Appl. No.: 09/679,954

(22) Filed: Oct. 4, 2000

(51) Int. Cl.[7] .................................................. G09G 5/00
(52) U.S. Cl. ........................ 345/785; 345/788; 345/780; 345/786; 345/858; 345/823; 345/830
(58) Field of Search ........................ 345/767, 784–787, 345/810, 802, 817, 821–823, 830, 864, 973, 780, 858

(56) References Cited

U.S. PATENT DOCUMENTS

| | | | | |
|---|---|---|---|---|
| 5,828,374 A | * | 10/1998 | Coleman et al. | 345/786 |
| 5,923,327 A | * | 7/1999 | Smith et al. | 345/784 |
| 5,974,413 A | * | 10/1999 | Beauregard et al. | 707/6 |
| 6,020,887 A | * | 2/2000 | Loring et al. | 345/786 |
| 6,097,431 A | * | 8/2000 | Anderson et al. | 345/841 |
| 6,141,011 A | * | 10/2000 | Bodnar et al. | 345/812 |
| 6,154,205 A | * | 11/2000 | Carroll et al. | 345/684 |
| 6,232,970 B1 | * | 5/2001 | Bodnar et al. | 345/708 |
| 6,249,765 B1 | * | 6/2001 | Adler et al. | 704/500 |
| 6,309,305 B1 | * | 10/2001 | Kraft | 455/566 |
| 6,327,586 B1 | * | 12/2001 | Kisiel | 345/781 |
| 6,366,302 B1 | * | 4/2002 | Crosby et al. | 345/786 |
| 6,381,474 B1 | * | 4/2002 | Kraft | 455/566 |

OTHER PUBLICATIONS

David Pogue, PalmPilot The Ultimate Guide, Jun. 1999, O'Reilly & Associates, Inc., Second Edition, pp. 3–7, 18–19, 285–291, 294–297, 304–305, 352–355, 369–370, 378, 423, 437, 328, 335, and 339.*

* cited by examiner

Primary Examiner—Kristine Kincaid
Assistant Examiner—Truc T Chuong
(74) Attorney, Agent, or Firm—Thelen Reid & Priest LLP; Marc S. Hanish

(57) ABSTRACT

Scrolling through one or more focusable and/or non-focusable items may be accomplished by: scrolling the display a set number of pixels in said direction if the cursor location is on a non-focusable item and an end border in said direction of said non-focusable item is not currently shown on the display; moving the cursor location to a next focusable item in said direction and scrolling the display enough in said direction to display said next focusable item if the cursor location is on a non-focusable item and an end border in said direction of said non-focusable item is currently shown on the display or if the cursor location is on a focusable item and a next item in said direction is a focusable item or if the cursor location is on a focusable item, the next item in said direction is a non-focusable item, and an end border in said direction of said non-focusable item is currently shown on the display; and moving the cursor location to a next non-focusable item and scrolling the display in said direction if the cursor location is on a focusable item and a next item in said direction is a non-focusable item having an end border in said direction not currently shown on the display or if the cursor location is on a non-focusable item and an end border in said direction of said non-focusable item is currently shown on the display. Provisions for elements within items are also described. The present invention allows for a user to scroll both focusable and non-focusable areas in an efficient, yet simple, manner, while potentially only using two buttons.

51 Claims, 19 Drawing Sheets

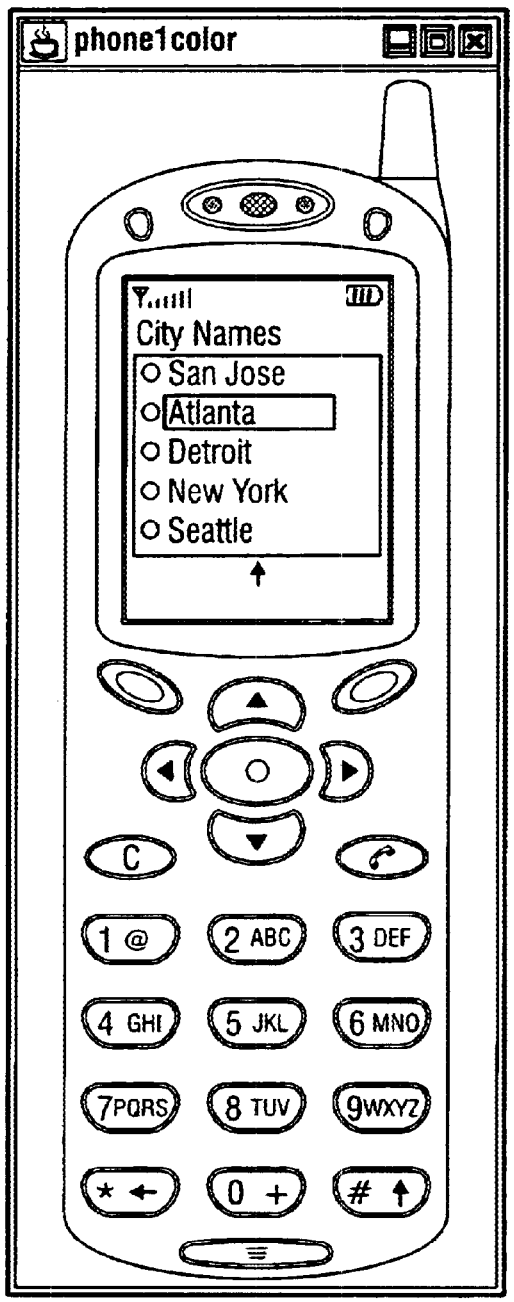
*FIG. 2H*  *FIG. 2I*

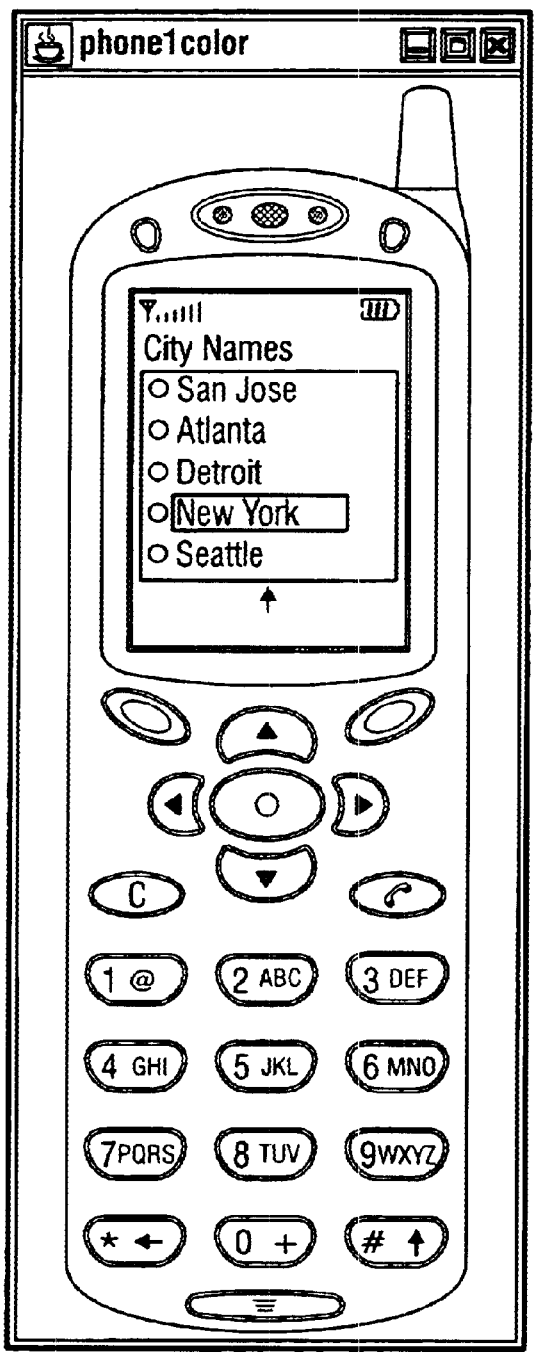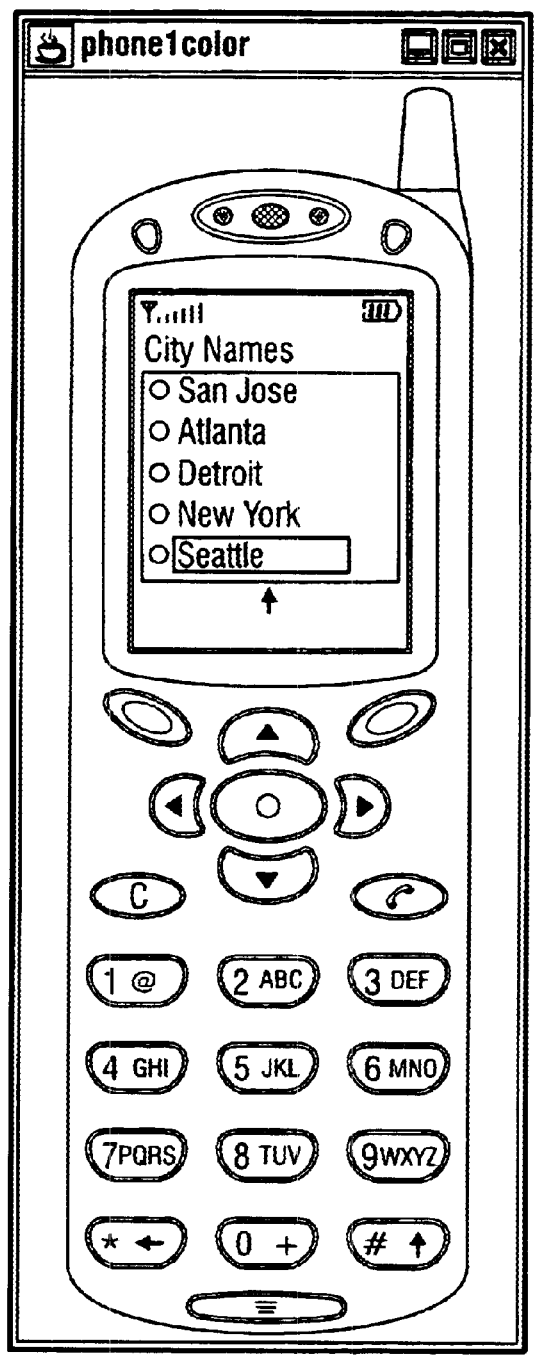
*FIG. 2J*          *FIG. 2K*

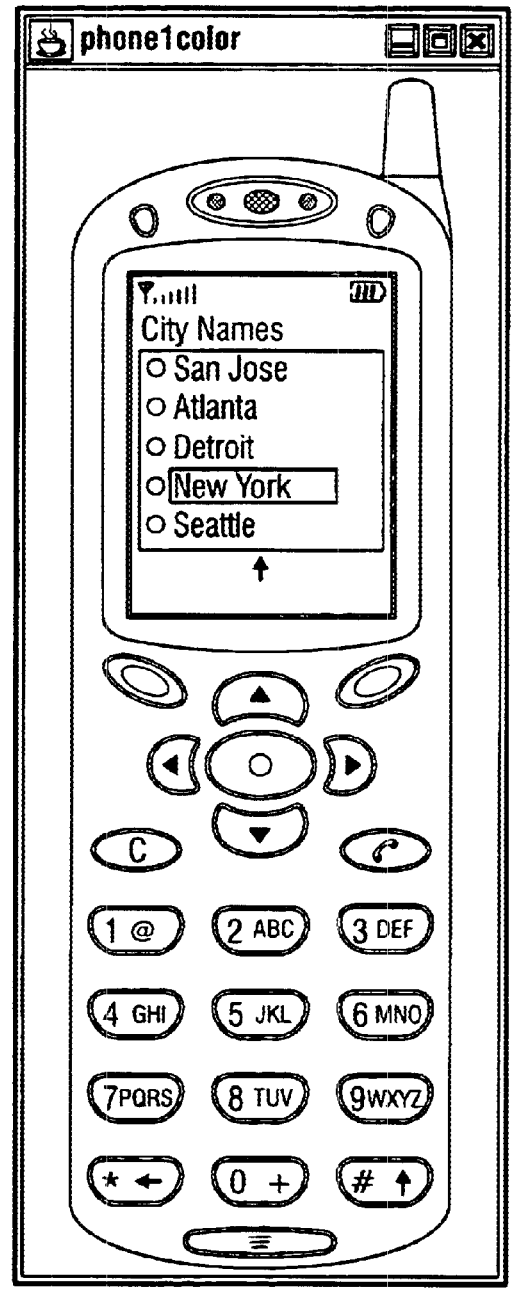
FIG. 3A                              FIG. 3B

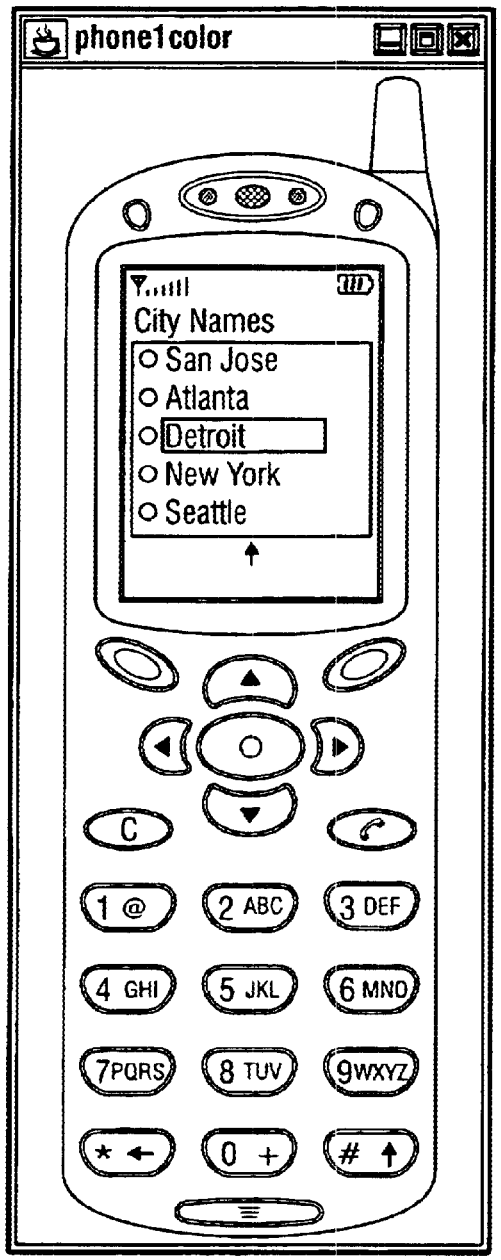
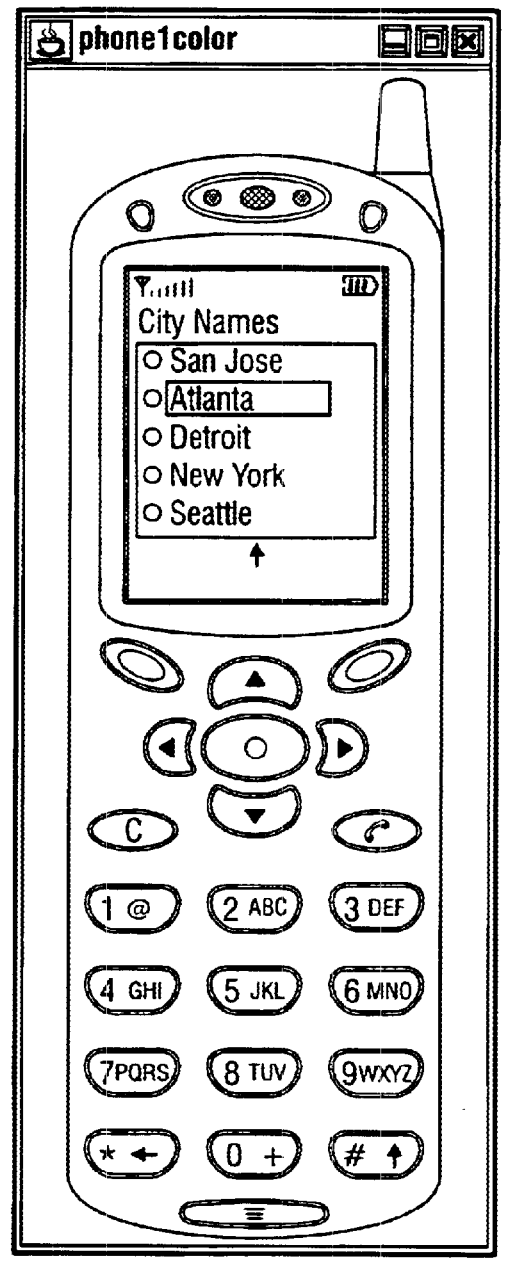
*FIG. 3C*         *FIG. 3D*

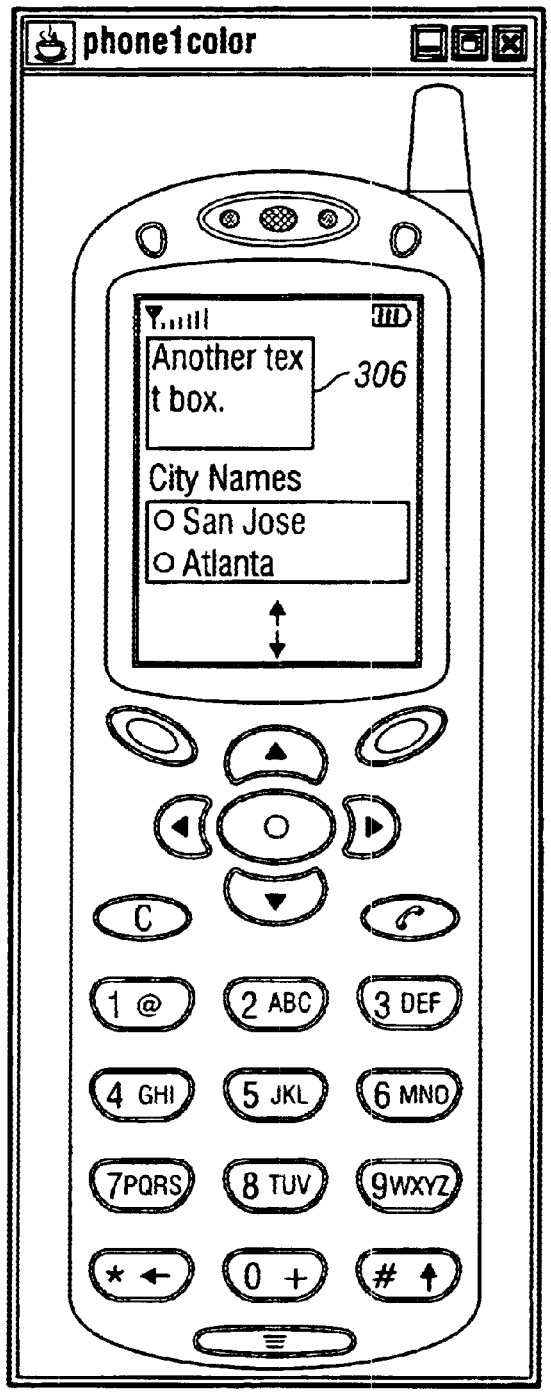
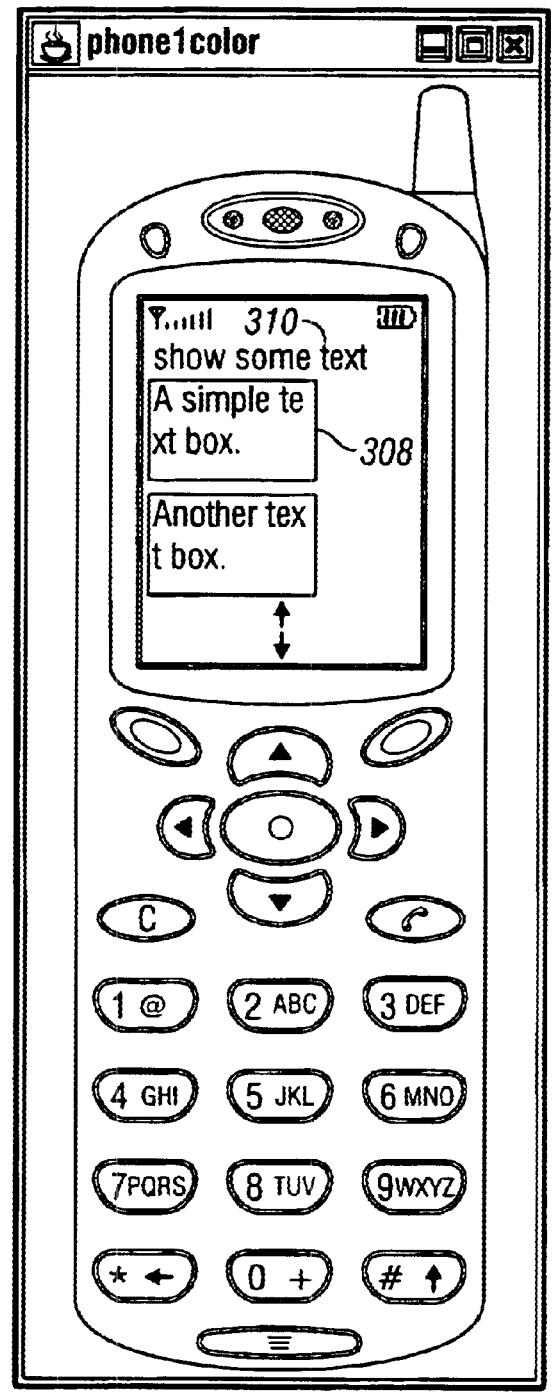
*FIG. 3G*        *FIG. 3H*

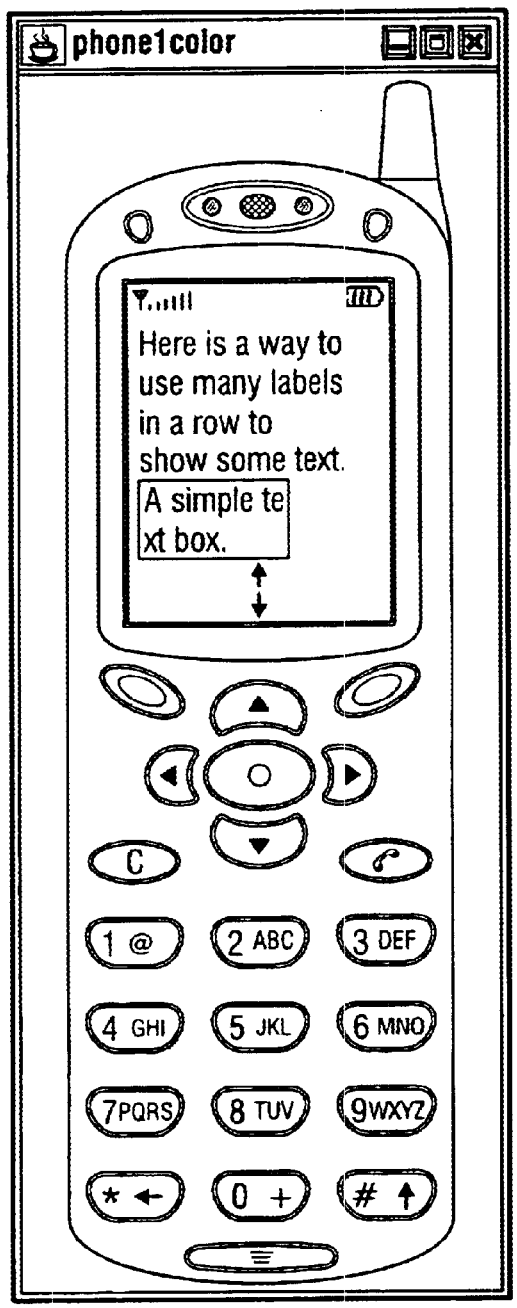
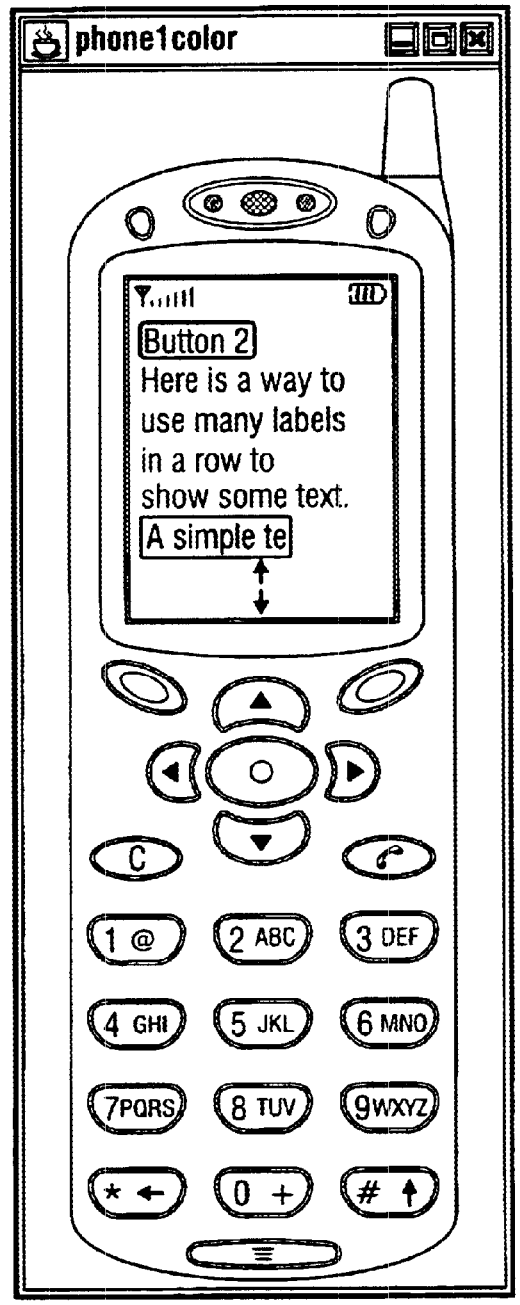
*FIG. 3K*     *FIG. 3L*

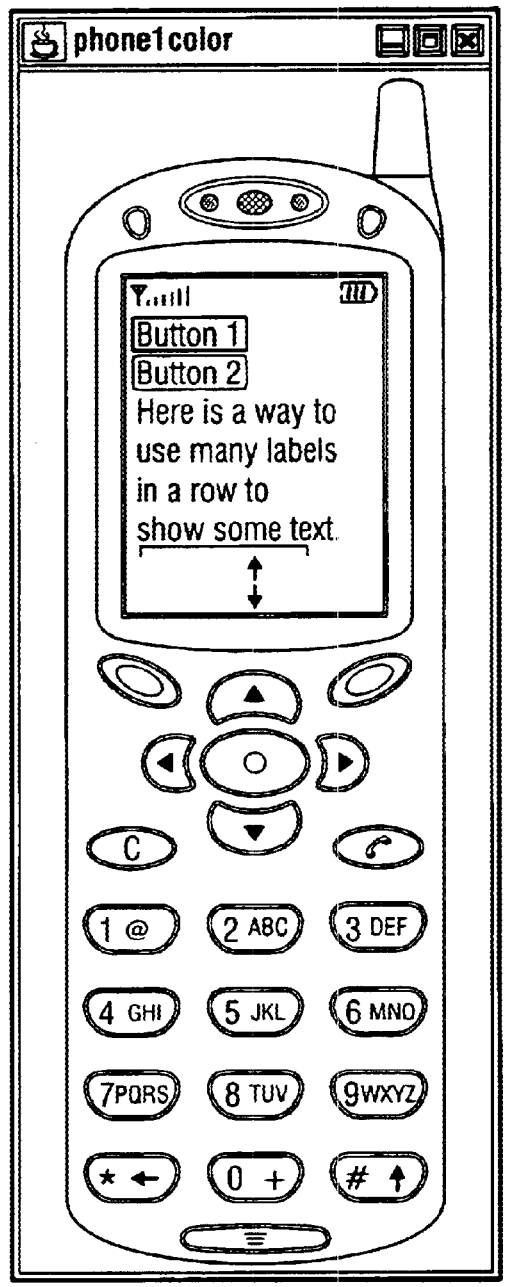 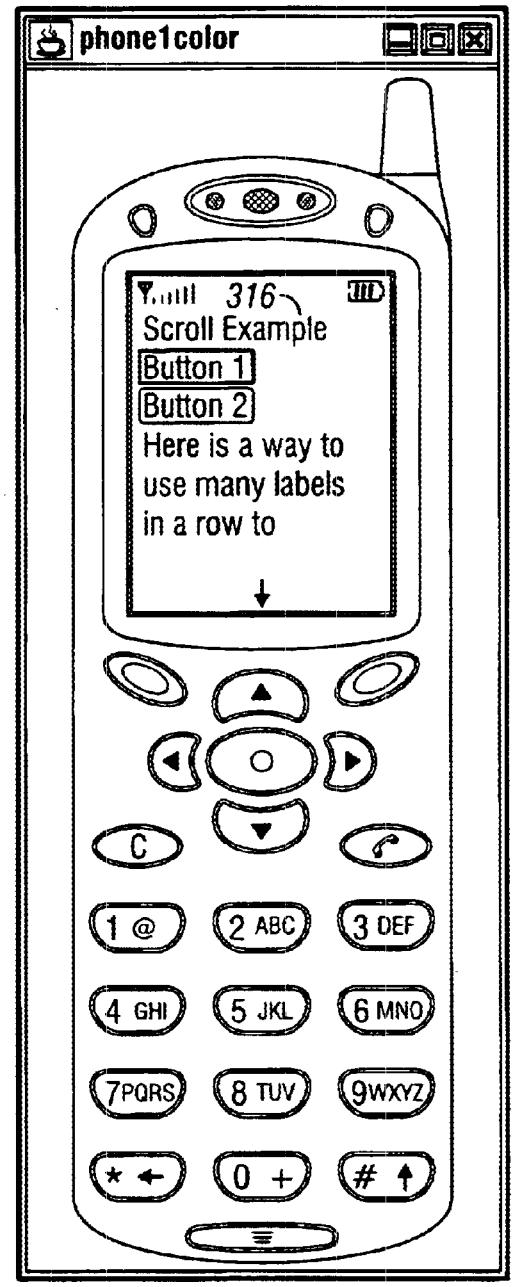
*FIG. 3M*  *FIG. 3N*

FOCUS-BASED SCROLLING

BACKGROUND OF THE INVENTION

1. Field of the Invention

The present invention relates to the field of display screens on electronic devices. More specifically, the present invention relates to scrolling through information on a display screen.

2. The Background

Various electronic devices have display screens for displaying information to and/or receiving input from a user. These devices may include computers, set-top boxes, pagers, and cellular phone, among others. When the information to be displayed on the screen exceeds the size limitations of the screen, it must be determined how the user is supposed to traverse through the information. Normally this is handled through scrolling.

Typical scrolling usually involves simply moving, the information up or down a set number of pixels in response to commands from the user. FIG. 1 is a diagram illustrating how scrolling is typically accomplished on a computer. A scroll bar 100 sets aside a portion of the screen for the control of the scrolling. A user wishing the move the information on the screen up a set number of pixels may move a mouse pointer to the up scroll arrow 102. A down scroll arrow 104 is provided for moving the information down a set number of pixels. How many pixels comprise the set number of pixels may normally be determined by the operating system or application designer. Other types of scrolling may be provided as well. If a user clicks on an area 106 of the scroll bar above the thumb 108 indicating the current information location, the display may jump up a different set number of pixels. This allows a user to choose between a slower scrolling rate and a higher one. For example, in a word processing application, the up and down scroll arrows 102, 104 may scroll the information up or down one line of text, while clicking on an empty area 106 of the scroll bar may scroll the information up one full display screen.

A problem, however, may be encountered in devices that do not have mouse capabilities and/or do not have a lot of room for extraneous keys, such as set-top boxes, pagers, and cellular phones. Taking the example of cellular phones, there are often a limited number of keys provided due to the size restrictions of most phones. Cellular phone screen information is additionally often divided into focusable and non-focusable areas. A focusable area is one in which the user may interact. Examples of focusable items include buttons, text input boxes, and lists with check boxes. A non-focusable area is one in which the user may not interact, but rather may only view. Generally this is simply textual material but it could also be graphics. This presents a special problem when scrolling because there needs to be a way to distinguish between a user request to scroll a set number of pixels, and a user request to skip down to the next focusable item. Additionally, when focusable items accept movement within the items, such as a list with check boxes, where a user may move up and down the list and check certain items off, there needs to be a way to distinguish between a user request to scroll a set number of pixels and a user request to skip to the next item in the focusable area.

Current solutions in the cellular phone realm include either providing a different set of keys for scrolling non-focusable areas as for focusable areas or forcing the user to scroll by a specific number of pixels irrespective of focusable or non-focusable areas. Extra keys require additional costs to the manufacturer and too many keys can be overwhelming to inexperienced cell phone users. Forcing the user to scroll by a specific number of pixel irrespective of focusable or non-focusable areas has several drawbacks of its own. The first is that there are often cases where a focusable area, such as a text box smaller than the display screen, is only partially visible in the viewing window. This forces a user to scroll down additional times merely to see what text he is typing. The second is that it can be very time consuming for a user to scroll down through a long list of text merely to get to the next focusable item.

What is needed is a solution which allows a user to scroll both focusable and non-focusable areas in an efficient, yet simple, manner.

SUMMARY OF THE INVENTION

Scrolling through one or more focusable and/or non-focusable items may be accomplished by: scrolling the display a set number of pixels in said direction if the cursor location is on a non-focusable item and an end border in said direction of said non-focusable item is not currently shown on the display; moving the cursor location to a next focusable item in said direction and scrolling the display enough in said direction to display said next focusable item if the cursor location is on a non-focusable item and an end border in said direction of said non-focusable item is currently shown on the display or if the cursor location is on a focusable item and a next item in said direction is a focusable item or if the cursor location is on a focusable item, the next item in said direction is a non-focusable item, and an end border in said direction of said non-focusable item is currently shown on the display; and moving the cursor location to a next non-focusable item and scrolling the display in said direction if the cursor location is on a focusable item and a next item in said direction is a non-focusable item having an end border in said direction not currently shown on the display or if the cursor location is on a non-focusable item and an end border in said direction of said non-focusable item is currently shown on the display. Provisions for elements within items are also described. The present invention allows for a user to scroll both focusable and non-focusable areas in an efficient, yet simple, manner, while potentially only using two buttons.

BRIEF DESCRIPTION OF THE DRAWINGS

FIG. 1 is a diagram illustrating how scrolling is typically accomplished on a computer.

FIGS. 2A–2K are diagrams illustrating examples of scrolling down through focusable and non-focusable items in accordance with a specific embodiment of the present invention.

DETAILED DESCRIPTION OF A PREFERRED EMBODIMENT

Figures 1, 2A:
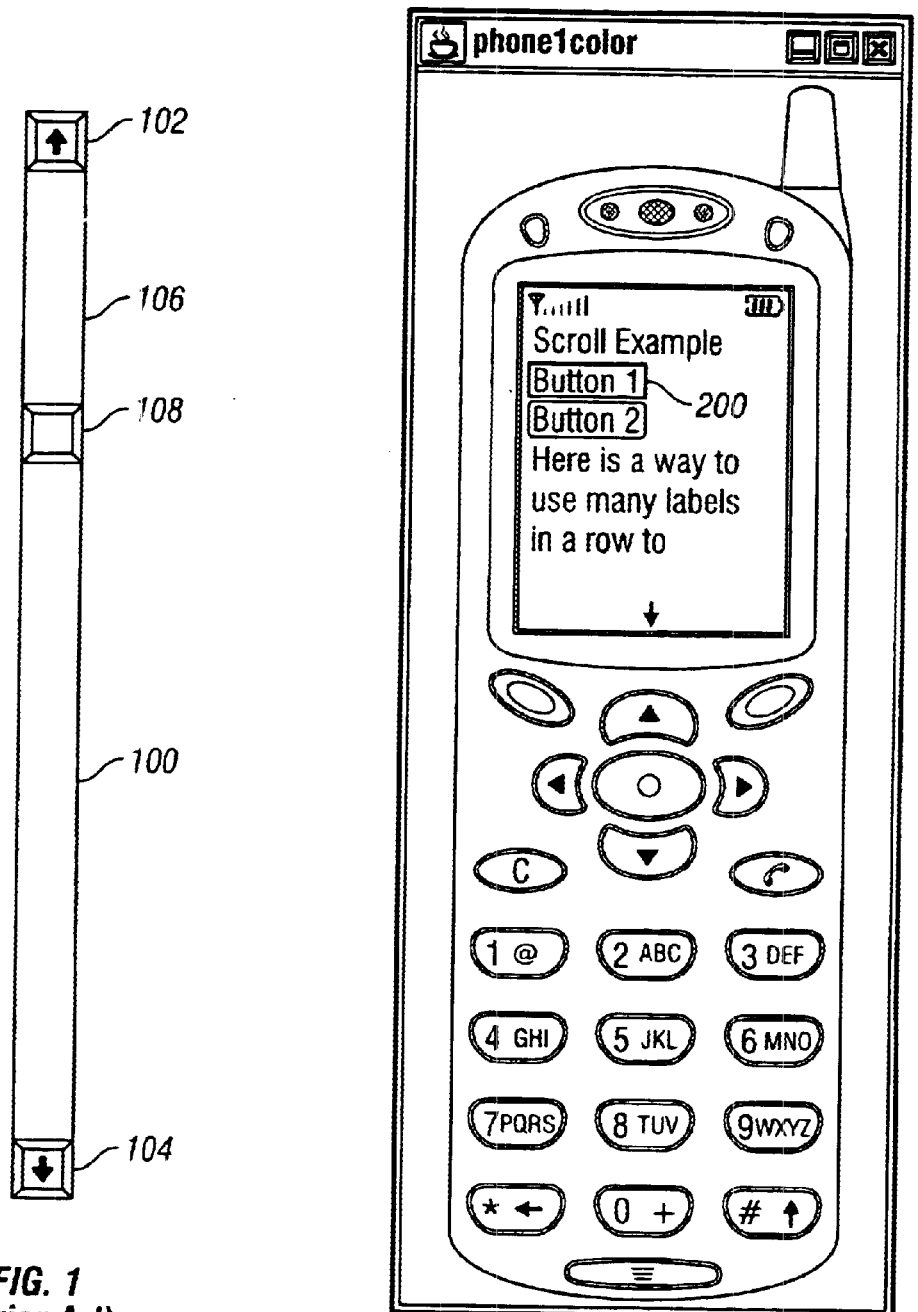

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using a combination of hardware and software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Individual items that are defined as focusable will be referred to in this application as focusable items. Individual items that are defined as non-focusable will be referred to as non-focusable items. A focusable item may have additional focusable or nonfocusable items within it, such as the elements in a list. For simplicity, this application will only discuss up to two levels of focusable items (e.g. a focusable item within another focusable item), but those of ordinary skill in the relevant art will recognize that implementations are possible with more than two levels of focusable items (e.g. a focusable item within another focusable item within another focusable item).

In a specific embodiment of the present invention, non-focusable items are scrolled through by stepping a set number of pixels up or down until the entire non-focusable item has been viewed. At that point, the screen will jump to the next focusable or non-focusable item. If the cursor location is on a focusable item, each subsequent button press in the same direction will then skip the screen to the next focusable item, until a non-focusable item is found. If there are no more items to display in a particular direction, subsequent button presses in that direction will produce no result on the screen. In the cases where a focusable item contains focusable or non-focusable items, the same method will be applied inside the focusable item, except that when the end of the focusable item is reached, the screen will proceed on to the next focusable or non-focusable item.

If a constraint is added regarding the maximum height of a non-focusable item, specifically that the maximum height is equal to the height of the display, then the method may be simplified. Rather than stepping a set number of pixels up or down, it may simply step to the next focusable or non-focusable item.

FIGS. 2A–2K are diagrams illustrating examples of scrolling down through focusable and non-focusable items in accordance with a specific embodiment of the present invention. In FIG. 2A, the cursor begins at the top of the page, with Button1 200, a focusable item with no items contained within it. Depressing a down arrow key 202 may result in the screen of FIG. 2B, where the cursor is now at Button2 204. Notice that the screen did not scroll a set number of pixels, but merely moved the cursor down. Further movement down results in the screen of FIG. 2C. Since the item following Button2 204 is a non-focusable one 206, the screen scrolls a set number of pixels, here roughly the number of pixels it takes to move one line of text. At this point though, the non-focusable item 206 has been displayed on the screen. Therefore, when the down key is depressed again, the screen skips down to the next focusable item 208 in FIG. 2D. Notice that screen jumps enough to display the entire focusable text box 208, rather than just scrolling enough to show the first line of the text box 208.

Figure 2B:
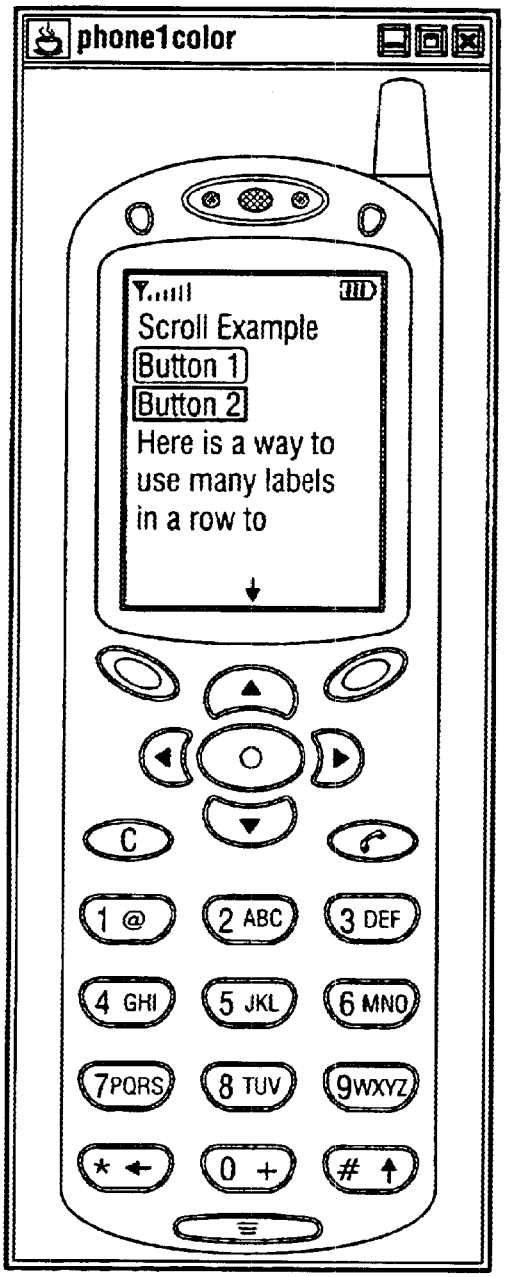
Figure 2C:
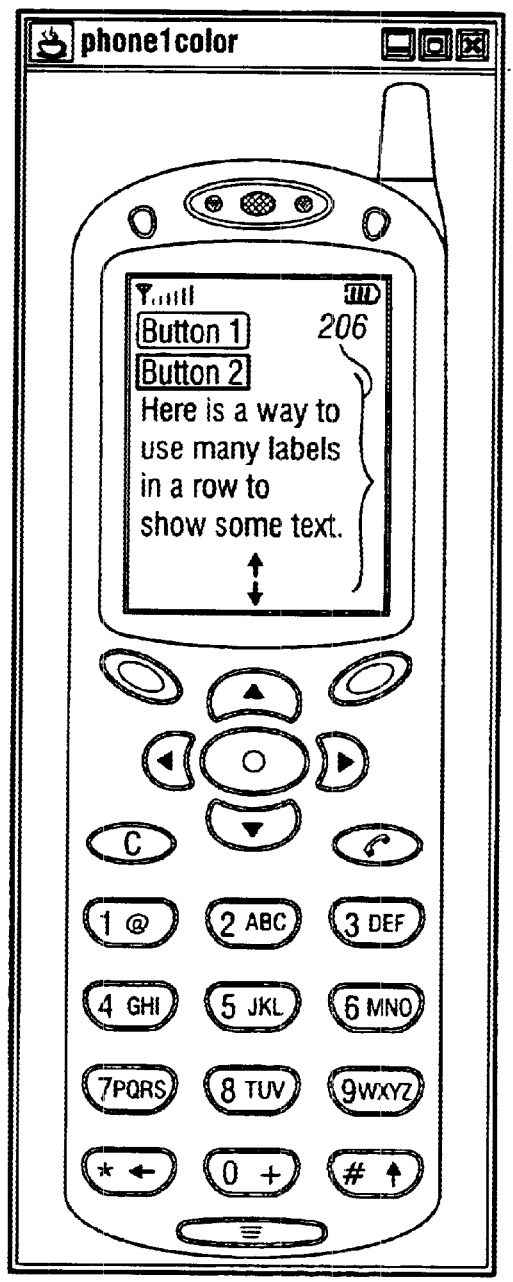
Figure 2D:
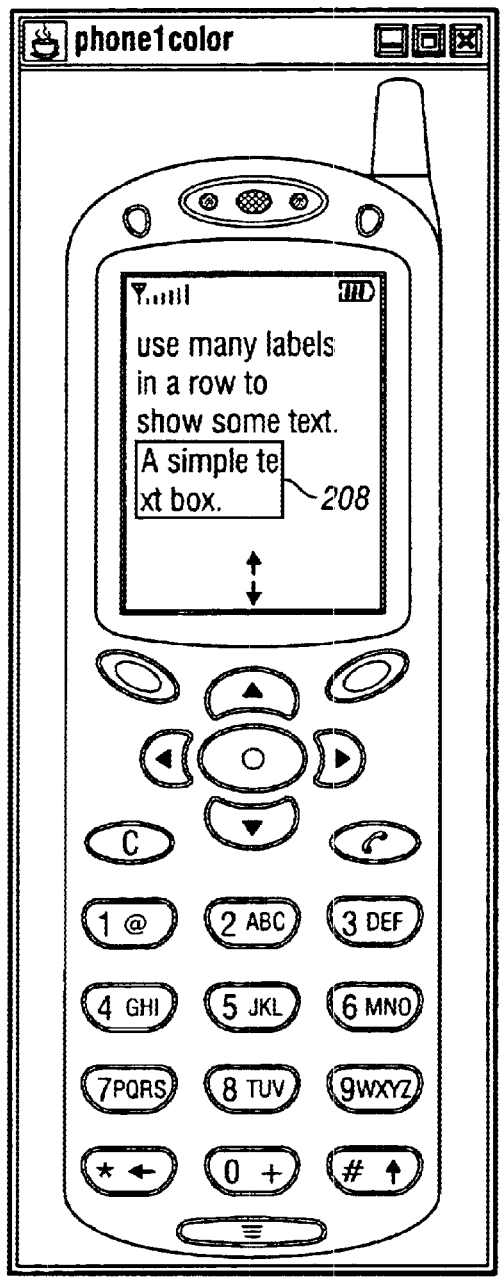
Figure 2E:
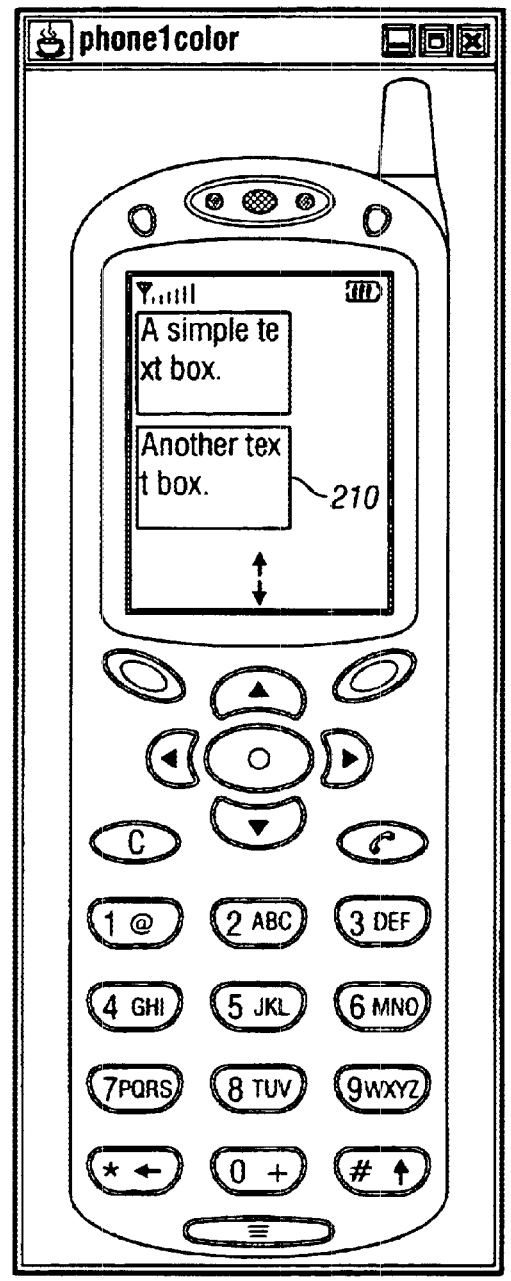
Figure 2F:
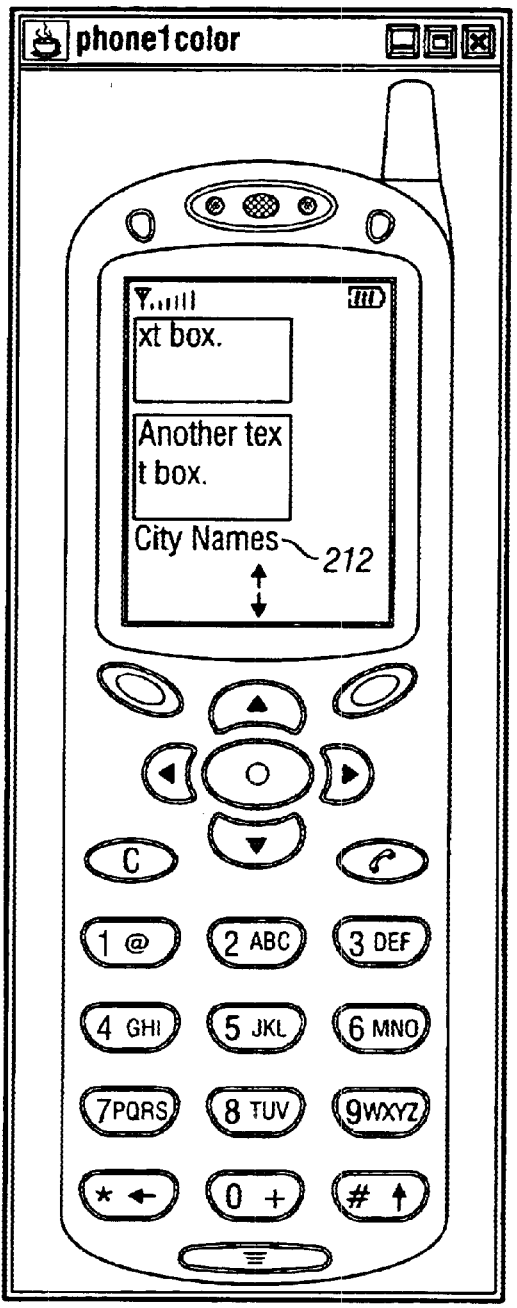
Figure 2G:
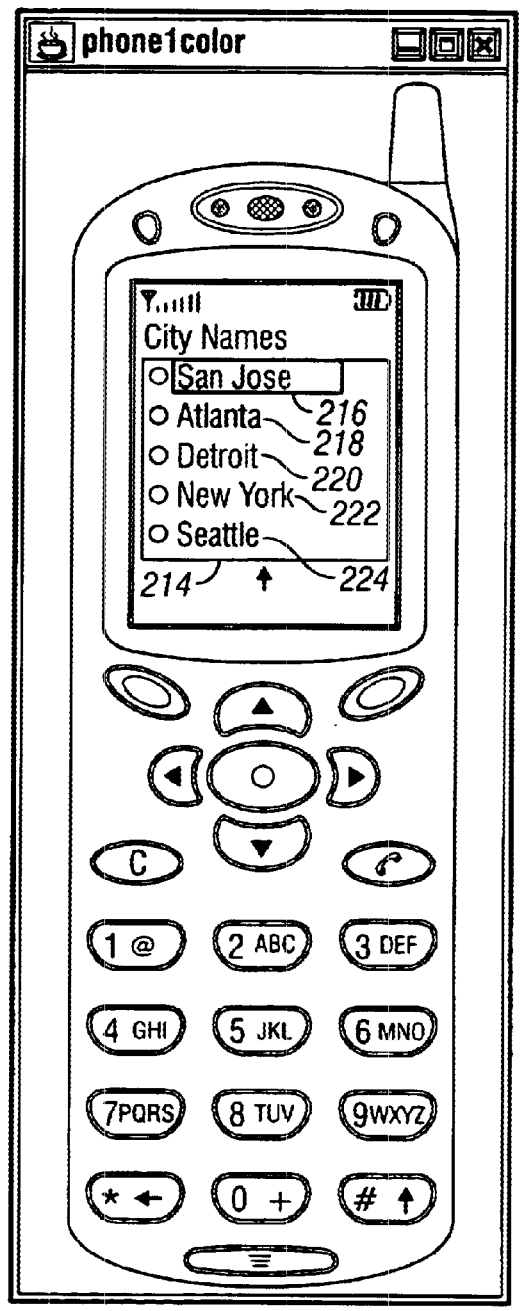

FIG. 2E shows the screen after another down arrow key has been depressed. The screen has now skipped down to the next focusable item 210. In FIG. 2F, however, another non-focusable item 212 has been encountered. Therefore, at this point the screen once again scrolls a set number of pixels, displaying the first line in the non-focusable text. FIG. 2G shows that the non-focusable text was only one line long. The next item is a focusable list 214. This focusable list contains several focusable elements 216, 218, 220, 222, 224 within it. Therefore, the screen jumps to the focusable list, displaying the entire focusable list on the screen, and places the cursor at the first focusable element within the list. Further down arrow key depresses result in the screens of FIGS. 2H, 2I, 2J, and 2K, ending when the end of both focusable and non-focusable items has been reached.

Figure 3E:
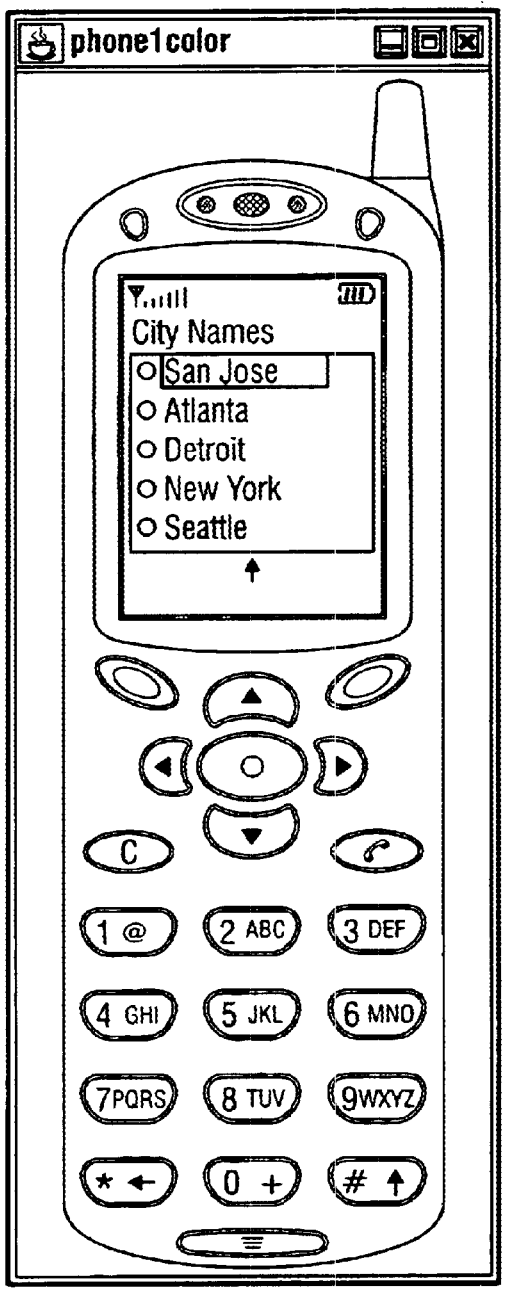
FIGS. 3A–3N are diagrams illustrating examples of scrolling up through focusable and non-focusable items in accordance with a specific embodiment of the present invention.
Figure 3F:
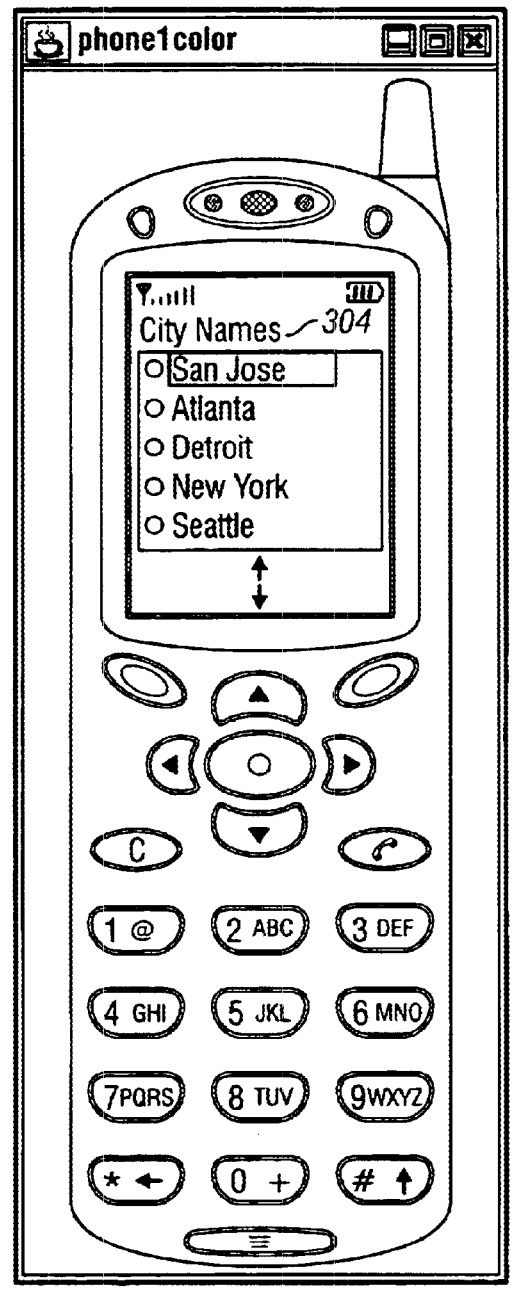
Figure 3I:
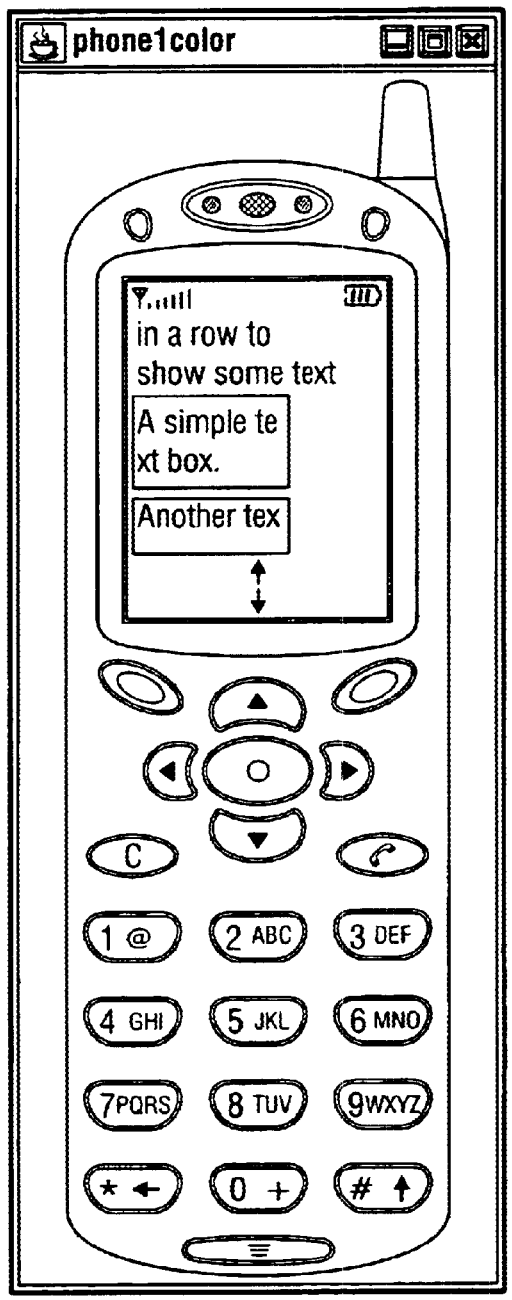
Figure 3J:
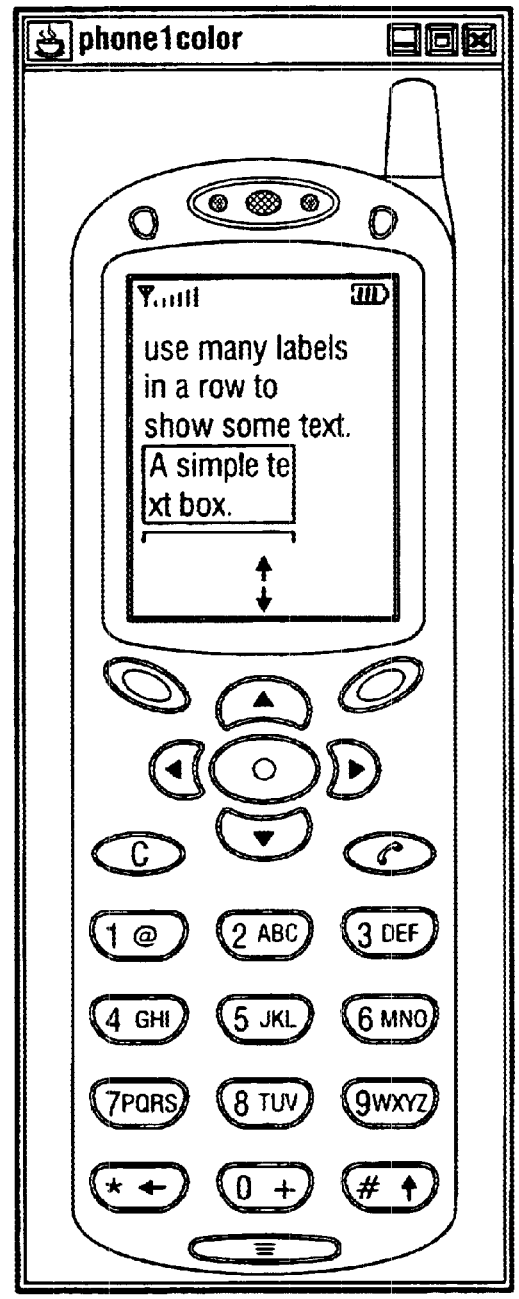

FIGS. 3A–3K are diagrams illustrating examples of scrolling up through focusable and non-focusable items in accordance with a specific embodiment of the present invention. FIG. 3A is identical to FIG. 2K, thus the cursor begins at the last item 300 in the focusable list 302. Stepping up through the focusable items gives the screens of FIGS. 3B–3E. At this point, the process moves to FIG. 3F, where the non focusable item 304 is encountered. Moving up reveals a focusable item (306 in FIG. 3G) followed by another focusable item (308 in FIG. 3H). Scrolling up again reveals a non-focusable area 310. Therefore, at this point, further upwards movement results in scrolling a fixed number of pixels until the entire non-focusable area has been viewed. Thus, the screen scrolls up a fixed number of pixels in FIGS. 3I–3K. Then, in FIG. 3L, a focusable item 312 is once again encountered, followed by another 314 in FIG. 3M. Finally, in FIG. 3N, the top with some non-focusable text 316 is encountered, allowing no further upwards movement.

It should be noted that if the constraint was in place, then the non-focusable area would have been split into multiple non-focusable areas, each one smaller in height than the height of the display. If each smaller non-focusable area was only one line of text high, it would enable the user to step up one line of text each time the arrow key was pressed.

Figure 4:
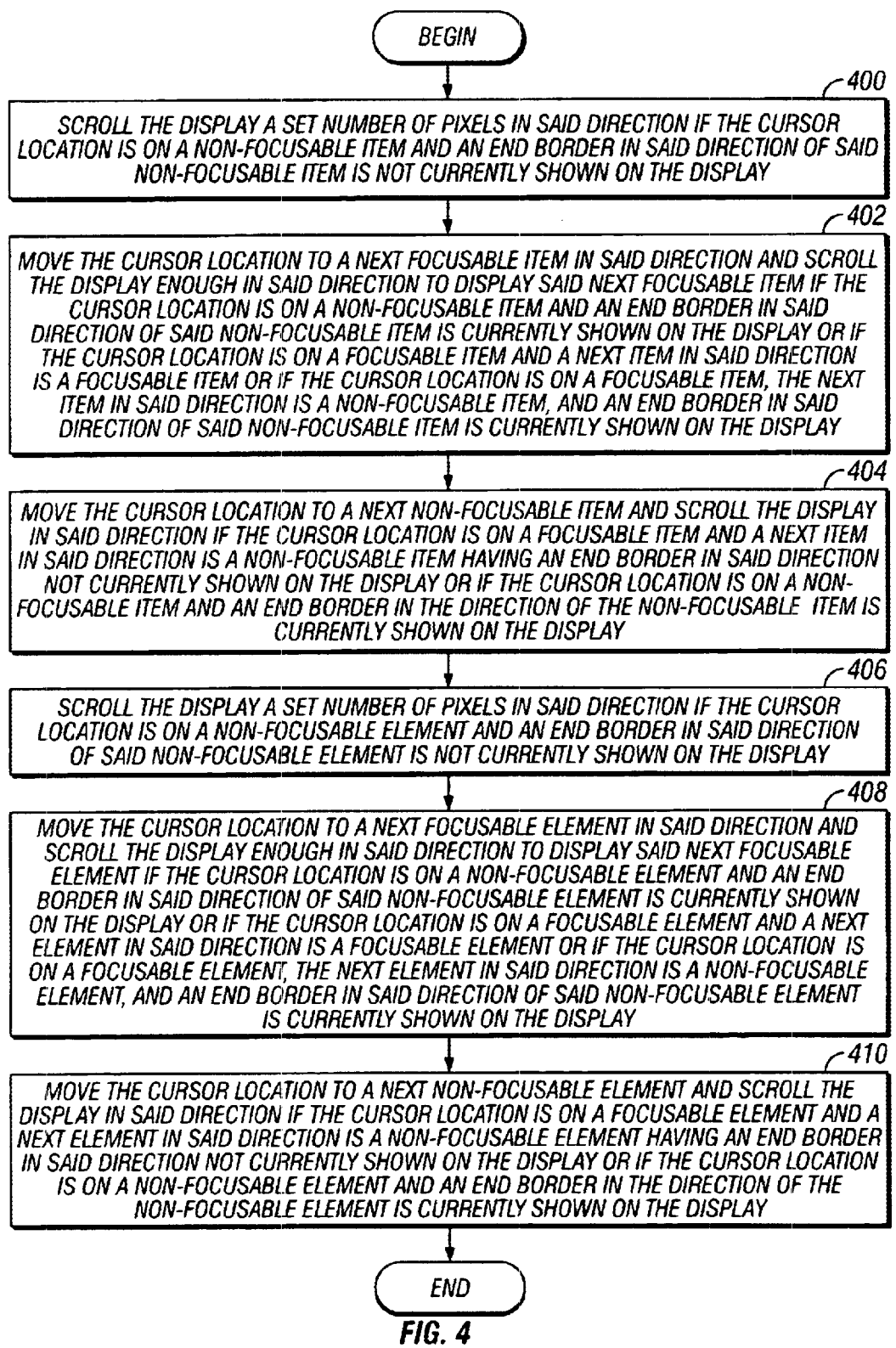
FIG. 4 is a flow diagram illustrating a method for scrolling in a direction on a display through one or more items in accordance with a specific embodiment of the present invention.

FIG. 4 is a flow diagram illustrating a method for scrolling in a direction on a display through one or more items in accordance with a specific embodiment of the present invention. The one or more items may include focusable and/or non-focusable items. Additionally, the display may have a cursor location. It should be noted that the cursor location will usually, but not always, be displayed on the display as an inverse of the item in which its contained. For example, a button containing the cursor location may be displayed as white text with a black background instead of black text with a white background. Additionally, in a specific embodiment of the present invention, the cursor location will only be displayed on the display if it is contained in a focusable item. An implementation is also possible where if the cursor location is contained in a non-focusable item, not only doesn't the cursor location appear on the display in the non-focusable item but it actually still appears in the last focusable item.

At 400, the display is scrolled a set number of pixels in the direction if the cursor location is on a non-focusable item and an end border in the direction of the non-focusable item is not currently shown on the display. At 402, the cursor location may be moved to a next focusable item in the direction and the display may be scrolled enough in the direction to display the next focusable item if the cursor location is on a non-focusable item and an end border in the direction of the non-focusable item is currently shown on the display or if the cursor location is on a focusable item and a next item in the direction is a focusable item or if the cursor location is on a focusable item, the next item in the direction is a non-focusable item, and an end border in the direction of the non-focusable item is currently shown on the display. At 404, the cursor location is moved to a next non-focusable item and the display may be scrolled in the direction if the cursor location is on a focusable item and a next item in the direction is a non-focusable item having an end border in the direction not currently shown on the display.

Additionally, a focusable item may contain one or more focusable or non-focusable elements. Thus, if the cursor location is on one of these elements in an item and the element is not the last element in the direction in the item, then the following actions may be taken. At 406, the display is scrolled a set number of pixels in the direction if the cursor location is on a non-focusable element and an end border in the direction of the non-focusable element is not currently shown on the display or if the cursor location is on a non-focusable item and an end border in said direction of said non-focusable item is currently shown on the display. At 408, the cursor location may be moved to a next focusable element in the direction the display may be scrolled enough in the direction to display the next focusable element if the cursor location is on a non-focusable element and an end border in the direction of the non-focusable element is currently shown on the display or if the cursor location is on a focusable element and a next element in the direction is a focusable element or if the cursor location is on a focusable element, the next element in the direction is a non-focusable element, and an end border in the direction of the non-focusable element is currently shown on the display. At 410, the cursor location is moved to a next non-focusable element and the display may be scrolled in the direction if the cursor location is on a focusable element and a next element in the direction is a non-focusable element having an end border in the direction not currently shown on the display or if the cursor location is on a non-focusable element and an end border in said direction of said non-focusable element is currently shown on the display.

In a specific embodiment of the present invention, the set number of pixels is equal to one line of text. Additionally, the end border of a non-focusable item is a top if the direction is up and a bottom if the direction is down. If the direction is up, a next item may be either to the left of or above the cursor location. If the direction is down, a next item may be either to the right of or below the cursor location. These last two caveats allow for the case where more than one item is contained on a single line.

Figure 5A:
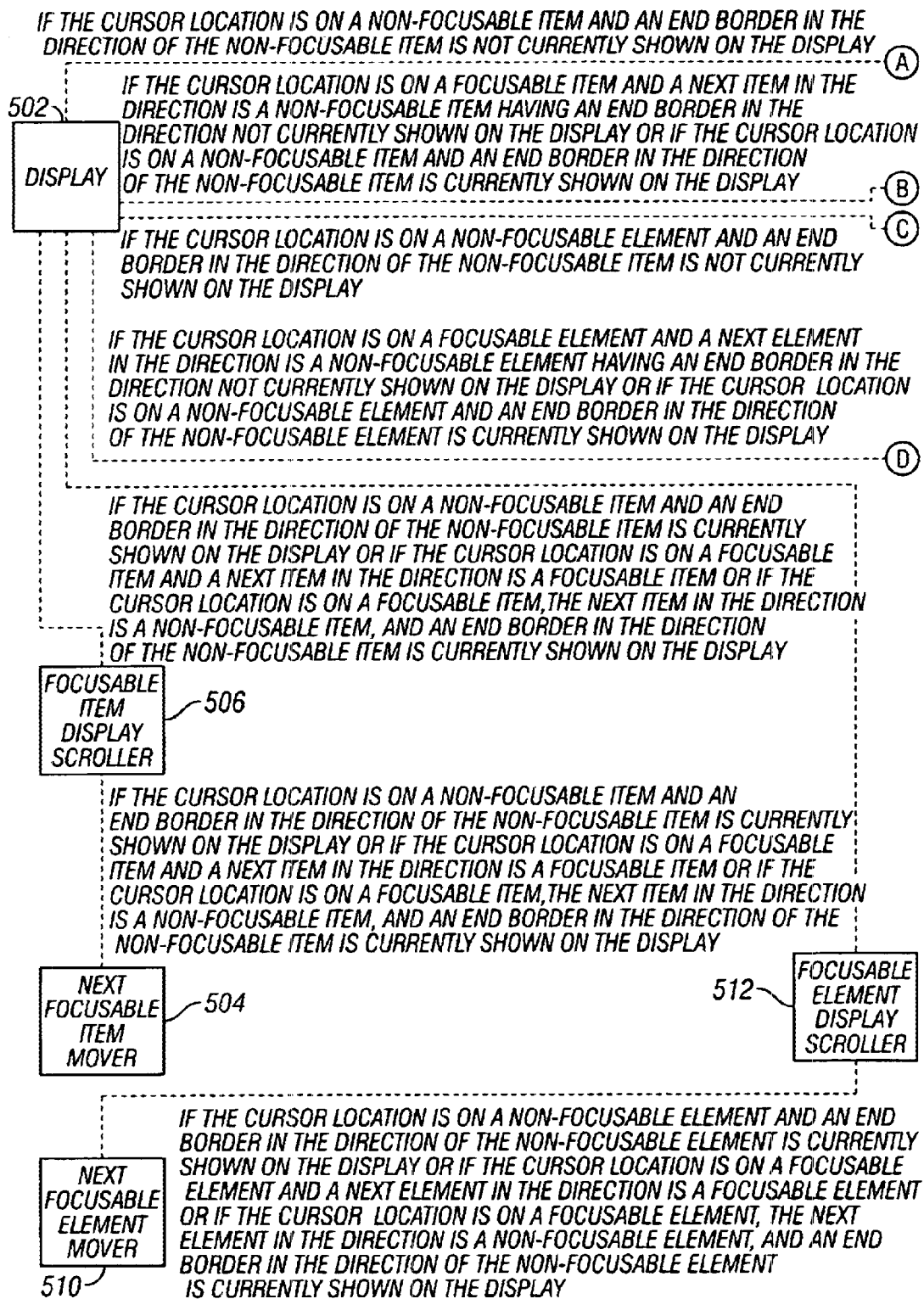
FIG. 5 is a block diagram illustrating an apparatus for scrolling in a direction on a display through one or more items in accordance with a specific embodiment of the present invention.
Figure 5B:
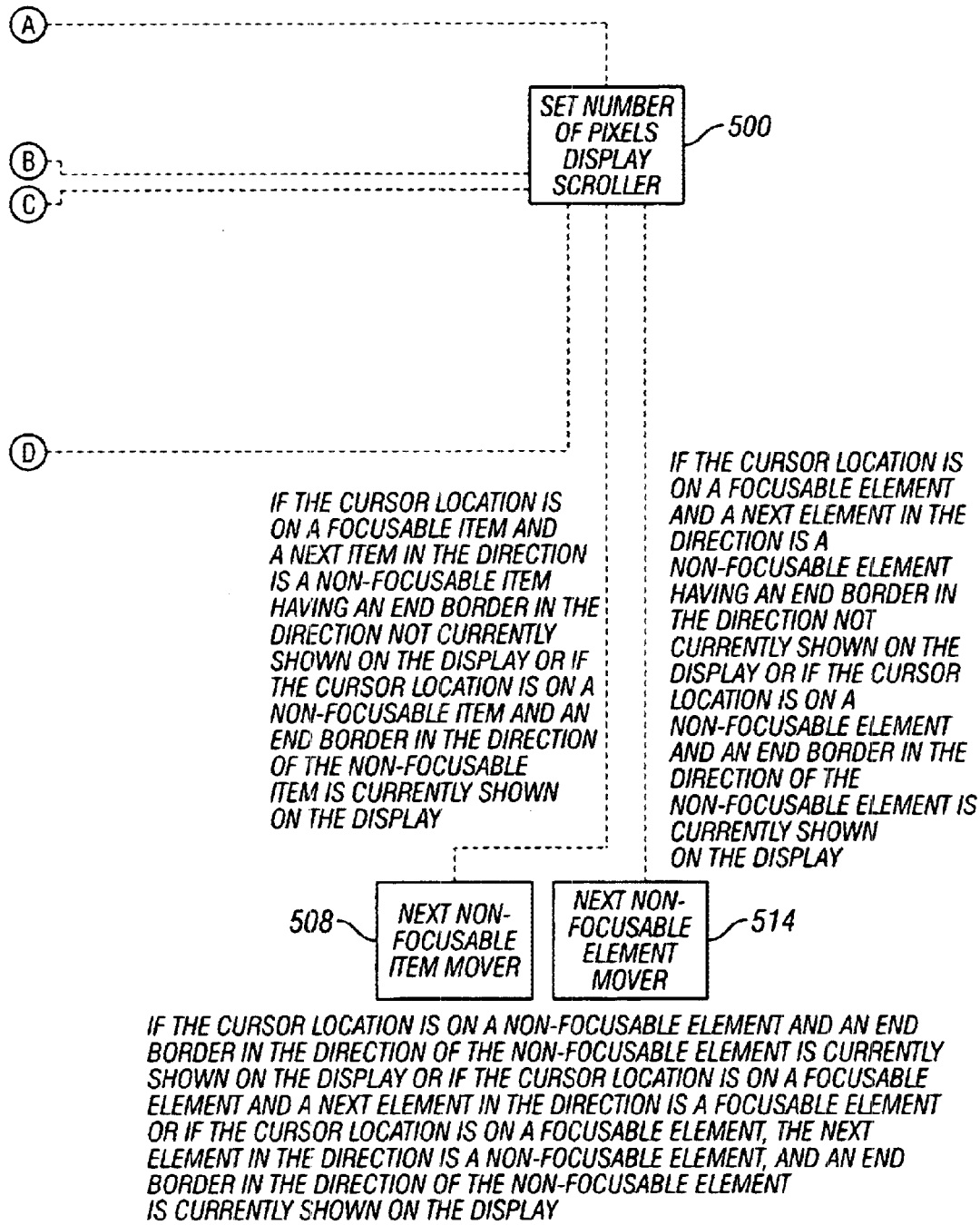

FIG. 5 is a block diagram illustrating an apparatus for scrolling in a direction on a display through one or more items in accordance with a specific embodiment of the present invention. The one or more items may include focusable and/or non-focusable items. Additionally, the display may have a cursor location. It should be noted that the cursor location will usually, but not always, be displayed on the display as an inverse of the item in which its contained. For example, a button containing the cursor location may be displayed as white text with a black background instead of black text with a white background. Additionally, in a specific embodiment of the present invention, the cursor location will only be displayed on the display if it is contained in a focusable item. An implementation is also possible where if the cursor location is contained in a non-focusable item, not only doesn't the cursor location appear on the display in the non-focusable item but it actually still appears in the last focusable item.

A set number of pixels display scroller 500 scrolls the display a set number of pixels in the direction. The set number of pixels display scroller 500 may be coupled to the display 502 if the cursor location is on a non-focusable item and an end border in the direction of the non-focusable item is not currently shown on the display. A next focusable item mover 504 moves the cursor location to a next focusable item in the direction. A focusable item display scroller 506 may scroll the display enough in the direction to display the next focusable item. The next focusable item mover 504 may be coupled to the focusable item display scroller 506 and the focusable item display scroller 506 may be coupled to the display 502 if the cursor location is on a non-focusable item and an end border in the direction of the non-focusable item is currently shown on the display or if the cursor location is on a focusable item and a next item in the direction is a focusable item or if the cursor location is on a focusable item, the next item in the direction is a non-focusable item, and an end border in the direction of the non-focusable item is currently shown on the display. A next non-focusable item mover 508 may move the cursor location to a next non-focusable item. The next non-focusable item mover 508 may be coupled to the set number of pixels display scroller 500 and the set number of pixels display scroller coupled to the display 502 if the cursor location is on a focusable item and a next item in the direction is a non-focusable item having an end border in the direction not currently shown on the display or if the cursor location is on a non-focusable item and an end border in said direction of said non-focusable item is currently shown on the display.

Additionally, a focusable item may contain one or more focusable or non-focusable elements. Thus, if the cursor location is on one of these elements in an item and the element is not the last element in the direction in the item, then the following components should be present. The set number of pixels display scroller 500 is coupled to the display 502 if the cursor location is on a non-focusable element and an end border in the direction of the non-focusable element is not currently shown on the display. A next focusable element mover 510 may move the cursor location to a next focusable element in the direction. A focusable element display scroller 512 may scroll the display enough in the direction to display the next focusable element. The next focusable element mover 510 may be coupled to the focusable element display scroller 512 and the focusable element display scroller 512 coupled to the display 502 if the cursor location is on a non-focusable element and an end border in the direction of the non-focusable element is currently shown on the display or if the cursor location is on a focusable element and a next element in the direction is a focusable element or if the cursor location is on a focusable element, the next element in the direction is a non-focusable element, and an end border in the direction of the non-focusable element is currently shown on the display. A next non-focusable element mover 514 may move the cursor location to a next non-focusable element. The next non-focusable element mover 514 may be coupled to the set number of pixels display scroller 500 and the set number of pixels display scroller 500 coupled to the display 502 if the cursor location is on a focusable element and a next element in the direction is a non-focusable element having an end border in the direction not currently shown on the display or if the cursor location is on a non-focusable element and an end border in said direction of said non-focusable element is currently shown on the display.

In a specific embodiment of the present invention, the set number of pixels is equal to one line of text. Additionally, the end border of a non-focusable item is a top if the direction is up and a bottom if the direction is down. If the direction is up, a next item may be either to the left of or above the cursor location. If the direction is down, a next item may be either to the right of or below the cursor location. These last two caveats allow for the case where more than one item is contained on a single line.

If a constraints is in place limiting the height of any non-focusable item to a maximum of the height of the display, then each time an up or down button is pressed, the method may move to the next focusable item until the top or bottom is reached unless doing so would cause the cursor location to skip over non-focusable areas not shown on the display.

Figure 6:
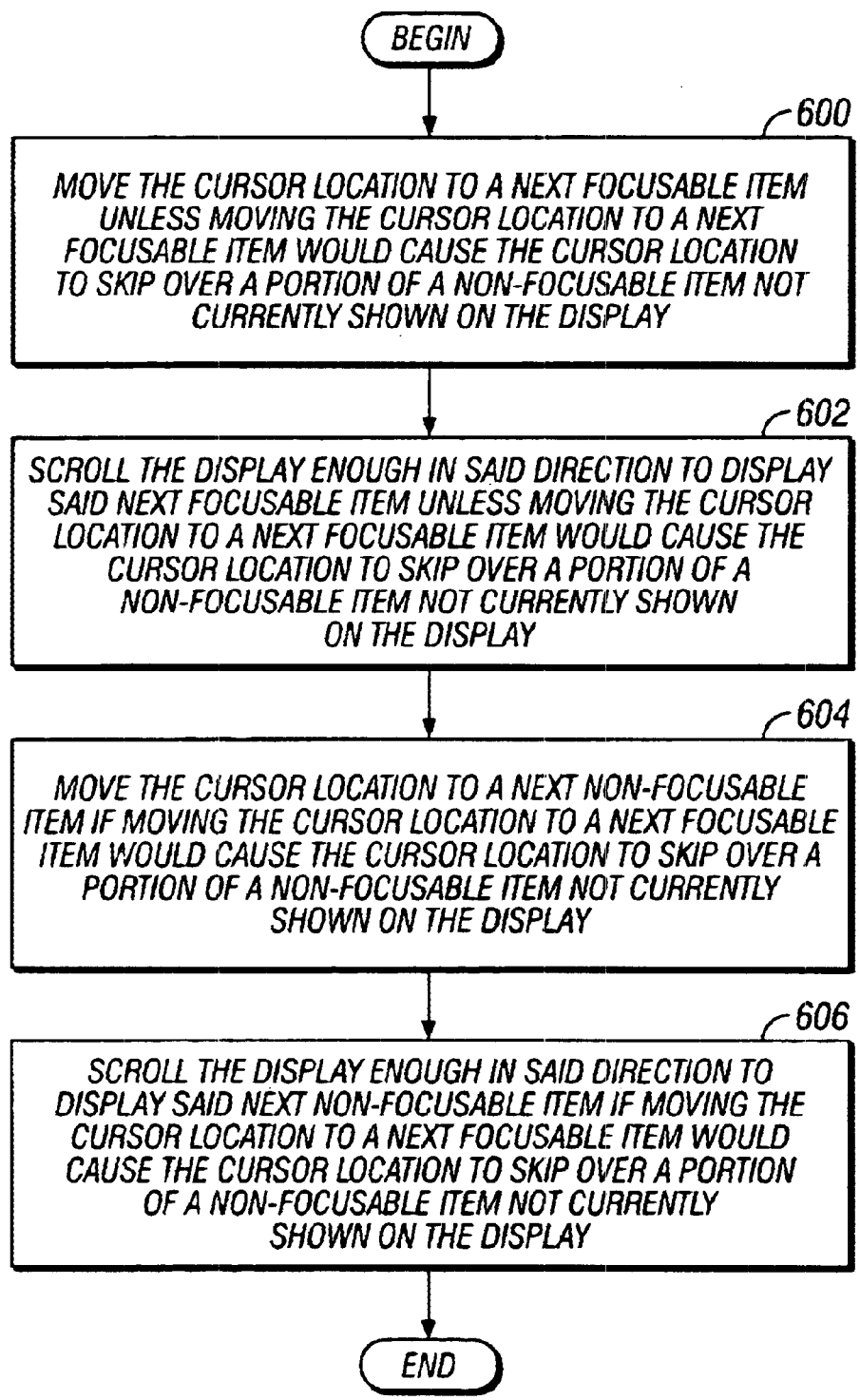
FIG. 6 is a flow diagram illustrating a method for scrolling in a direction on a display through one or more items in accordance with another embodiment of the present invention.

FIG. 6 is a flow diagram illustrating a method for scrolling in a direction on a display through one or more items in accordance with another embodiment of the present invention. In this embodiment, constraints are in place limiting non-focusable items to a maximum height equal to the height of the display.

At 600, the cursor location is moved to a next focusable item unless doing so would cause the cursor location to skip over a portion of a non-focusable item not currently shown on the display. At 602, the display is scrolled enough in said direction to display said next focusable item unless doing so would cause the cursor location to skip over a portion of a non-focusable item not currently shown on the display. At 604, the cursor location is moved to a next non-focusable item if moving the cursor location to a next focusable item would cause the cursor location to skip over a portion of a non-focusable item not currently shown on the display. At 606 the display is scrolled enough in said direction to display said next non-focusable item if moving the cursor location to a next focusable item would cause the cursor location to skip over a portion of a non-focusable item not currently shown on the display.

If the cursor location is on one of these elements in an item and the element is not the last element in the direction in the item, then the following process should be executed. At 608, the cursor location is moved to a next focusable element unless doing so would cause the cursor location to skip over a portion of a non-focusable element not currently shown on the display. At 610, the display is scrolled enough in said direction to display said next focusable element unless doing so would cause the cursor location to skip over a portion of a non-focusable element not currently shown on the display. At 612, the cursor location is moved to a next non-focusable element if moving the cursor location to a next focusable element would cause the cursor location to skip over a portion of a non-focusable element not currently shown on the display. Finally, at 614 the display is scrolled enough in said direction to display said next non-focusable element if moving the cursor location to a next focusable element would cause the cursor location to skip over a portion of a non-focusable element not currently shown on the display.

Figure 7A:
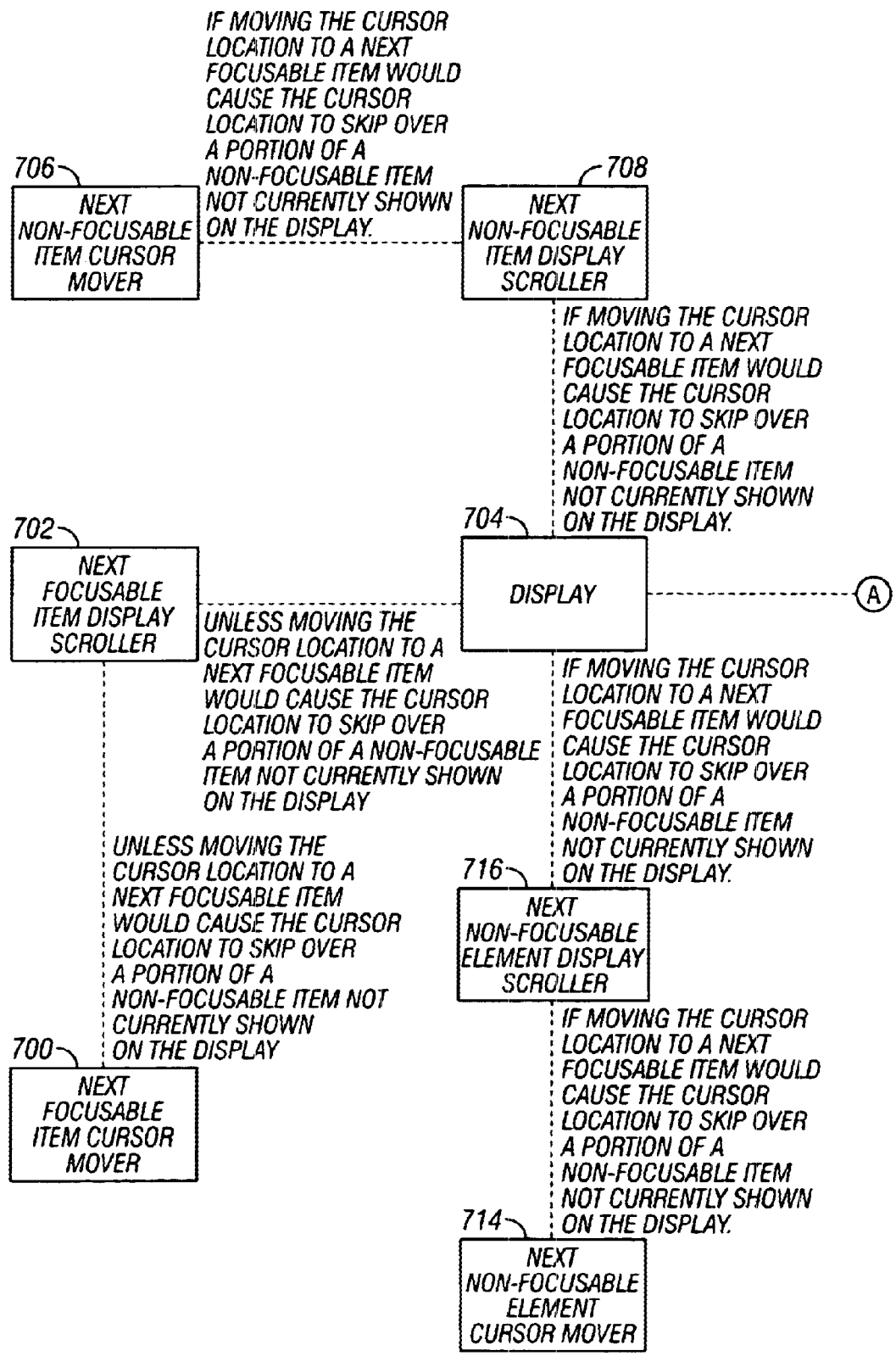
FIG. 7 is a block diagram illustrating an apparatus for scrolling in a direction on a display through one or more items in accordance with another embodiment of the present invention.
Figure 7B:
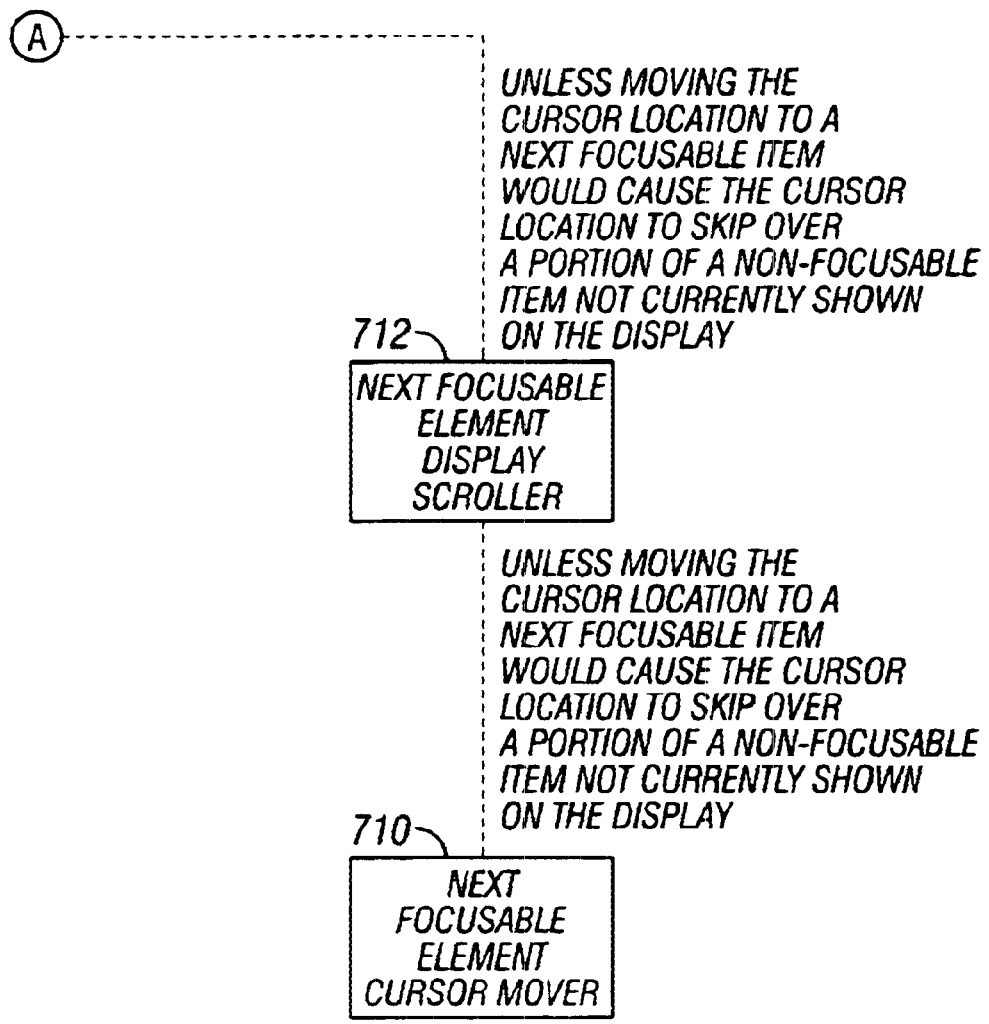

FIG. 7 is a block diagram illustrating an apparatus for scrolling in a direction on a display through one or more items in accordance with another embodiment of the present invention. In this embodiment, constraints are in place limiting non-focusable items to a maximum height equal to the height of the display.

A next focusable item cursor mover 700 moves the cursor location to a next focusable item. A next focusable item display scroller 702 scrolls the display enough in said direction to display said next focusable item. The next focusable item cursor mover 700 is coupled to the next focusable item display scroller 702 and the next focusable item display scroller 702 is coupled to the display 704 unless moving the cursor location to a next focusable item would cause the cursor location to skip over a portion of a non-focusable item not currently shown on the display. A next non-focusable item cursor mover 706 moves the cursor location to a next non-focusable item. A next non-focusable item display scroller 708 scrolls the display enough in said direction to display said next non-focusable item. The next non-focusable item cursor mover 706 is coupled to said next non-focusable item display scroller 708 and said next non-focusable item display scroller 708 is coupled to the display 704 if moving the cursor location to a next focusable item would cause the cursor location to skip over a portion of a non-focusable item not currently shown on the display.

If the cursor location is on one of these elements in an item and the element is not the last element in the direction in the item, then the following components should be present.

A next focusable element cursor mover 710 moves the cursor location to a next focusable element. A next focusable element display scroller 712 scrolls the display enough in said direction to display said next focusable element. The next focusable element cursor mover 710 is coupled to the next focusable element display scroller 712 and the next focusable element display scroller 712 is coupled to the display 704 unless moving the cursor location to a next focusable element would cause the cursor location to skip over a portion of a non-focusable element not currently shown on the display. A next non-focusable element cursor mover 714 moves the cursor location to a next non-focusable element. A next non-focusable element display scroller 716 scrolls the display enough in said direction to display said next non-focusable element. The next non-focusable element cursor mover 714 is coupled to said next non-focusable element display scroller 716 and said next non-focusable element display scroller 716 is coupled to the display 704 if moving the cursor location to a next focusable element would cause the cursor location to skip over a portion of a non-focusable element not currently shown on the display.

Additionally, in all embodiments, it is possible to add a second set of keys, called supplemental keys. These keys may simply be left and right arrows occasionally used for functions unrelated to the present invention. Supplemental keys may be used to skip over elements when the cursor location is on an element in a focusable item. Using a supplemental key forces the method to simply move to the next item, rather than merely moving to the next element. This allows a user to quickly skip over unimportant elements in a list to get to the next item.

What is claimed is:

1. A method for scrolling a display including one or more items, the one or more items being either focusable or non-focusable, the display having a cursor on a displayed area, said method including:

if the cursor is on a non-focusable item which end border in a first direction is not currently shown on the displayed area, scrolling the display a set number of pixels in the first direction;

if the cursor is on a non-focusable item which end border in the first direction is currently shown on the displayed area and a next item is a focusable item, scrolling the display in the first direction such that the next focusable item is entirely shown on the displayed area and moving the cursor to the next focusable item;

if the cursor is on a focusable item and a next item in the first direction is a focusable item shown on the displayed area, moving the cursor to the next focusable item;

if the cursor is on a focusable item and a next item in the first direction is a focusable item not shown on the displayed area, scrolling the display in the first direction such that the next focusable item is shown on the displayed area and moving the cursor to the next focusable item;

if the cursor is on a focusable item and the next item in the first direction is a non-focusable item which end border in the first direction is currently shown on the displayed area, scrolling the display in the first direction such that a next focusable item is shown on the displayed area and moving the cursor to the next focusable item;

if the cursor is on a focusable item and a next item in the first direction is a non-focusable item which end border in the first direction is not currently shown on the displayed area, scrolling the display in the first direction and moving the cursor to the next non-focusable item; and if the cursor is on a non-focusable item which end border in the first direction is currently shown on the displayed area and a next item is a non-focusable item, scrolling the display in the first direction and moving the cursor to the next non-focusable item.

2. The method of claim 1, wherein the focusable item contains one or more elements which are focusable or non-focusable, the cursor is on an element which is not the last element in the first direction in the item, the method further including:

if the cursor is on a non-focusable element which end border in the first direction is not currently shown on the displayed area, scrolling the display a set number of pixels in the first direction;

if the cursor is on a non-focusable element which end border in the first direction is currently shown on the display area and a next element in the first direction is a focusable element, scrolling the display in the first direction such that the next focusable element is entirely shown in the display area and moving the cursor to the next focusable element;

if the cursor is on a focusable element and a next element in the first direction is a focusable element shown on the displayed area, moving the cursor location to the next focusable element;

if the cursor is on a focusable element and a next element in the first direction is a focusable element not shown on the displayed area, scrolling the display in the first direction such that the next focusable element is shown in the displayed area and moving the cursor location to the next focusable element;

if the cursor is on a focusable element and a next element in the first direction is a non-focusable element which end border in the first direction is currently shown on the displayed area, scrolling the display in the first direction such that a next focusable element is shown in the displayed area and moving the cursor location to the next focusable element; and if the cursor location is on a focusable element and a next element in the first direction is a non-focusable element having an end border in said direction not currently shown on the display, scrolling the display in the first direction and moving the cursor to the next non-focusable element; and if the cursor location is on a non-focusable element which end border in the first direction is currently shown on the displayed area and a next element in the first direction is a non-focusable element, scrolling the display in the first direction and moving the cursor to the next non-focusable element.

3. The method of claim 2, wherein the set number of pixels is one line of text.

4. The method of claim 2, wherein the end border of the non-focusable element is a top there of if the first direction is up, and a bottom thereof if the first direction is down.

5. The method of claim 2, wherein if the first direction is up, the next element in the first direction includes either one of:

an element to the left of the cursor; and an element above the cursor.

6. The method of claim 2, wherein if the first direction is down, the next element in the first direction includes either one of:

an element to the right of the cursor; and an element below the cursor.

7. The method of claim 2, wherein if a supplemental key is pressed, regardless of a current location of the cursor within the focusable item, the display is scrolled such that the next item is shown in the displayed area and the cursor is moved to the next item.

8. The method in accordance with claim 2, wherein whenever the display is scrolled in the first direction such that the next focusable element is shown in the displayed area, the next focusable element is entirely shown in the displayed area.

9. The method of claim 1, wherein the set number of pixels is one line of text.

10. The method of claim 1, wherein the end border of the non-focusable item is a top if the first direction is up, and a bottom if the first direction is down.

11. The method of claim 1, wherein if the first direction is up, the next item in the first direction includes either one of:

an item to the left of the cursor; and an item above the cursor.

12. The method of claim 1, wherein if the first direction is down, the next item in the first direction includes either one of:

an item to the right of the cursor; and an item below the cursor.

13. The method in accordance with claim 1, wherein whenever the display is scrolled in the first direction such that the next focusable item is shown in the displayed area, the next focusable item is entirely shown in the displayed area.

14. The method in accordance with claim 1, further comprising:

indicating a location of the cursor if the cursor is on a focusable item.

15. A method for scrolling a display including one or more items, the one or more items being either focusable or non-focusable, the display having a cursor on a displayed area, no non-focusable item having a height greater than the height of the displayed area, said method including:

scrolling the display in the first direction such that a next focusable item is shown in the displayed area and moving the cursor to the next focusable item, unless said scrolling and said moving would cause the cursor to skip over a portion of a non-focusable item not currently shown on the displayed area; and if said scrolling and said moving would cause the cursor to skip over a portion of a non-focusable item not currently shown on the displayed area, scrolling the display in the first direction such that the next non-focusable item is shown in the displayed area and moving the cursor to the next non-focusable item.

16. The method of claim 15, wherein the focusable item contains one or more elements which are focusable or non-focusable, the cursor is on an element which is not the last element in the first direction in the item, the method further including:

scrolling the display in the first direction such that a next focusable element is shown in the displayed area and moving the cursor to the next focusable element, unless said scrolling and moving would cause the cursor to skip over a portion of a non-focusable element not currently shown on the displayed area; and if said scrolling and moving would cause the cursor to skip over a portion of a non-focusable element not currently shown on the displayed area, scrolling the display in the first direction such that the next non-focusable element is shown in the displayed area and moving the cursor to the next non-fousable element.

17. The method of claim 16, wherein if the first direction is up, the next element in the first direction includes either one of:

an element to the left of the cursor; and an element above the cursor.

18. The method of claim 16, wherein if the first direction is down, the next element in the first direction includes either one of:

an element to the right of the cursor; and an element below the cursor.

19. The method of claim 16, wherein if a supplemental key is pressed, regardless of a current location of the cursor within the focusable item, the display is scrolled such that the next item is shown in the displayed area and the cursor is moved to the next item.

20. The method in accordance with claim 16, wherein whenever the display is scrolled in the first direction such that the next focusable element is shown in the displayed area, the next focusable element is entirely shown in the displayed area.

21. The method of claim 15, wherein if the first direction is up, the next item in the first direction includes either one of:

an item to the left of the cursor; and an item above the cursor.

22. The method of claim 15, wherein if the first direction is down, the next item in the first direction includes either one of:

an item to the right of the cursor; and an item below the cursor.

23. The method in accordance with claim 15, wherein whenever the display is scrolled in the first direction such that the next focusable item is shown in the displayed area, the next focusable item is entirely shown in the displayed area.

24. The method in accordance with claim 15, further comprising:

indicating a location of the cursor if the cursor is on a focusable item.

25. A method for scrolling a display of a cellular phone, the display including one or more items, the one or more items being either focusable or non-focusable, the cellular phone having a single button for moving in a first direction, the display having a cursor in a displayed area, said method including:

if the cursor is on a non-focusable item which end border in the first direction is not currently shown on the displayed area, scrolling the display a set number of pixels in the first direction in response to the single button being pressed;

if the cursor is on a non-focusable item which end border in the first direction is currently shown on the displayed area and a next item is a focusable item, scrolling the display in the first direction such that the next focusable item is entirely shown on the displayed area and moving the cursor to the next focusable item, in response to the single button being pressed;

if the cursor is on a focusable item and a next item in the first direction is a focusable item shown on the displayed area, moving the cursor to the next focusable item in response to the single button being pressed;

if the cursor is on a focusable item and a next item in the first direction is a focusable item not shown on the displayed area, scrolling the display in the first direction such that the next focusable item is shown on the displayed area and moving the cursor to the next focusable item, in response to the single button being pressed;

if the cursor is on a focusable item and the next item in the first direction is a non-focusable item which end border in the first direction is currently shown on the displayed area, scrolling the display in the first direction such that a next focusable item is shown on the displayed area and moving the cursor to the next focusable item, in response to the single button being pressed;

if the cursor is on a focusable item and a next item in the first direction is a non-focusable item which end border in the first direction is not currently shown on the displayed area, scrolling the display in the first direction and moving the cursor to the next non-focusable item, in response to the single button being pressed; and if the cursor is on a non-focusable item which end border in the first direction is currently shown on the displayed area and a next item is a non-focusable item, scrolling the display in the first direction and moving the cursor to the next non-focusable item, in response to the single button being pressed.

26. The method of claim 25, wherein the focusable item contains one or more elements which are focusable or non-focusable, the cursor is on an element which is not the last element in the first direction in the item, the method further including:
  if the cursor is on a non-focusable element which end border in the first direction is not currently shown on the displayed area, scrolling the display a set number of pixels in the first direction;
  if the cursor is on a non-focusable element which end border in the first direction is currently shown on the display area and a next element in the first direction is a focusable element, scrolling the display in the first direction such that the next focusable element is entirely shown in the display area and moving the cursor to the next focusable element;
  if the cursor is on a focusable element and a next element in the first direction is a focusable element shown on the displayed area, moving the cursor location to the next focusable element;
  if the cursor is on a focusable element and a next element in the first direction is a focusable element not shown on the displayed area, scrolling the display in the first direction such that the next focusable element is shown in the displayed area and moving the cursor location to the next focusable element;
  if the cursor is on a focusable element and a next element in the first direction is a non-focusable element which end border in the first direction is currently shown on the displayed area, scrolling the display in the first direction such that a next focusable element is shown in the displayed area and moving the cursor location to the next focusable element; and
  if the cursor location is on a focusable element and a next element in the first direction is a non-focusable element having an end border in said direction not currently shown on the display, scrolling the display in the first direction and moving the cursor to the next non-focusable element; and
  if the cursor location is on a non-focusable element which end border in the first direction is currently shown on the displayed area and a next element in the first direction is a non-focusable element, scrolling the display in the first direction and moving the cursor to the next non-focusable element.

27. The method of claim 26, wherein the set number of pixels is one line of text.

28. The method of claim 26, wherein the end border of the non-focusable element is a top there of if the first direction is up, and a bottom thereof if the first direction is down.

29. The method of claim 26, wherein if the first direction is up, the next element in the first direction includes either one of:
  an element to the left of the cursor; and
  an element above the cursor.

30. The method of claim 26, wherein if the first direction is down, the next element in the first direction includes either one of:
  an element to the right of the cursor; and
  an element below the cursor.

31. The method of claim 26, wherein the cellular phone includes a supplemental key for specialized scrolling in each direction, and if the supplemental key is pressed, regardless of a current location of the cursor within the focusable item, the display is scrolled such that the next item is shown in the displayed area and the cursor is moved to the next item.

32. The method in accordance with claim 26, wherein whenever the display is scrolled in the first direction such that the next focusable element is shown in the displayed area, the next focusable element is entirely shown in the displayed area.

33. The method of claim 25, wherein the set number of pixels is one line of text.

34. The method of claim 25, wherein the end border of the non-focusable item is a top if the first direction is up, and a bottom if the first direction is down.

35. The method of claim 25, wherein if the first direction is up, the next item in the first direction includes either one of:
  an item to the left of the cursor; and
  an item above the cursor.

36. The method of claim 25, wherein if the first direction is down, the next item in the first direction includes either one of:
  an item to the right of the cursor; and
  an item below the cursor.

37. The method in accordance with claim 25, wherein whenever the display is scrolled in the first direction such that the next focusable item is shown in the displayed area, the next focusable item is entirely shown in the displayed area.

38. The method in accordance with claim 25, further comprising:
  indicating a location of the cursor if the cursor is on a focusable item.

39. A focusable and non-focusable item ready cellular phone, including:
  a display including one or more items, the one or more items being either focusable or non-focusable, said display having a cursor in a displayed area;
  a single button for moving in a first direction on said display;
  a memory containing instructions, said instructions including:
    if the cursor is on a non-focusable item which end border in the first direction is not currently shown on the displayed area, scrolling the display a set number of pixels in the first direction in response to said single button being pressed;
    if the cursor is on a non-focusable item which end border in the first direction is currently shown on the displayed area and a next item is a focusable item, scrolling the display in the first direction such that the next focusable item is entirely shown on the displayed area and moving the cursor to the next focusable item, in response to said single button being pressed;
    if the cursor is on a focusable item and a next item in the first direction is a focusable item shown on the displayed area, moving the cursor to the next focusable item in response to said single button being pressed;
    if the cursor is on a focusable item and a next item in the first direction is a focusable item not shown on the displayed area, scrolling the display in the first direction such that the next focusable item is shown on the displayed area and moving the cursor to the next focusable item, in response to said single button being pressed;
    if the cursor is on a focusable item and the next item in the first direction is a non-focusable item which end border in the first direction is currently shown on the displayed area, scrolling the display in the first direction such that a next focusable item is shown on the displayed area and moving the cursor to the next focusable item, in response to said single button being pressed;

if the cursor is on a focusable item and a next item in the first direction is a non-focusable item which end border in the first direction is not currently shown on the displayed area, scrolling the display in the first direction and moving the cursor to the next non-focusable item, in response to said single button being pressed; and if the cursor is on a non-focusable item which end border in the first direction is currently shown on the displayed area and a next item is a non-focusable item, scrolling the display in the first direction and moving the cursor to the next non-focusable item, in response to said single button being pressed.

40. A focusable and non-focusable item ready cellular phone including:
   a display including one or more items, the one or more items being either focusable or non-focusable, said display having a cursor in a displayed area, a height of each of the non-focusable items being less than a height of said display;
   a single button for moving in a first direction on said display;
   a memory containing instructions, said instructions including:
   scrolling the display in the first direction such that a next focusable item is shown in the displayed area and moving the cursor to the next focusable item, in response to said single button being pressed, unless said scrolling and said moving would cause the cursor to skip over a portion of a non-focusable item not currently shown on the displayed area; and
   if said scrolling and said moving would cause the cursor to skip over a portion of a non-focusable item not currently shown on the displayed area, scrolling the display in the first direction such that the next non-focusable item is shown in the displayed area and moving the cursor to the next non-focusable item, in response to said single button being pressed.

41. A program storage device readable by a machine, tangibly embodying a program of instructions executable by the machine to perform a method for scrolling a display including one or more items, the one or more items being either focusable or non-focusable, the display having a cursor on a displayed area, the method including:
   if the cursor is on a non-focusable item which end border in a first direction is not currently shown on the displayed area, scrolling the display a set number of pixels in the first direction;
   if the cursor is on a non-focusable item which end border in the first direction is currently shown on the displayed area and a next item is a focusable item, scrolling the display in the first direction such that the next focusable item is entirely shown on the displayed area and moving the cursor to the next focusable item;
   if the cursor is on a focusable item and a next item in the first direction is a focusable item shown on the displayed area, moving the cursor to the next focusable item;
   if the cursor is on a focusable item and a next item in the first direction is a focusable item not shown on the displayed area, scrolling the display in the first direction such that the next focusable item is shown on the displayed area and moving the cursor to the next focusable item;
   if the cursor is on a focusable item and the next item in the first direction is a non-focusable item which end border in the first direction is currently shown on the displayed area, scrolling the display in the first direction such that a next focusable item is shown on the displayed area and moving the cursor to the next focusable item;
   if the cursor is on a focusable item and a next item in the first direction is a non-focusable item which end border in the first direction is not currently shown on the displayed area, scrolling the display in the first direction and moving the cursor to the next non-focusable item; and
   if the cursor is on a non-focusable item which end border in the first direction is currently shown on the displayed area and a next item is a non-focusable item, scrolling the display in the first direction and moving the cursor to the next non-focusable item.

42. A program storage device readable by a machine, tangibly embodying a program of instructions executable by the machine to perform a method for scrolling a display including one or more items, the one or more items being either focusable or non-focusable, the display having a cursor on a displayed area, no non-focusable item having a height greater than the height of the displayed area, the method including:
   scrolling the display in the first direction such that a next focusable item is shown in the displayed area and moving the cursor to the next focusable item, unless said scrolling and said moving would cause the cursor to skip over a portion of a non-focusable item not currently shown on the displayed area; and
   if said scrolling and said moving would cause the cursor to skip over a portion of a non-focusable item not currently shown on the displayed area, scrolling the display in the first direction such that the next non-focusable item is shown in the displayed area and moving the cursor to the next non-focusable item.

43. An apparatus for scrolling a display including one or more items, the one or more items being either focusable or non-focusable, the display having a cursor on a displayed area, said apparatus including:
   a first scroller for scrolling the display a set number of pixels in the first direction;
   a second scroller for scrolling the display in the first direction such that a next focusable item is shown on the displayed area;
   a focusable item mover for moving the cursor to a next focusable item; and
   a non-focusable item mover for moving the cursor to a next non-focusable item,
   wherein said first scroller is coupled to the display if the cursor is on a non-focusable item which end border in the first direction is not currently shown on the displayed area,
   wherein said second scroller and said focusable item mover are coupled to the display, if the cursor is on a non-focusable item which end border in the first direction is currently shown on the displayed area and a next item is a focusable item, or if the cursor is on a focusable item and a next item in the first direction is a focusable item not shown on the displayed area, or if the cursor is on a focusable item and the next item in the first direction is a non-focusable item which end border in the first direction is currently shown on the displayed area,
   wherein said focusable item mover is coupled to the display, if the cursor is on a focusable item and a next item in the first direction is a focusable item shown on the displayed area, and wherein said first scroller and said non-focusable item mover are coupled to the display, if the cursor is on a focusable item and a next item in the first direction is a non-focusable item which end border in the first direction is not currently shown on the displayed area, or if the cursor is on a non-focusable item which end border in the first direction is currently shown on the displayed area and a next item is a non-focusable item.

44. The apparatus in accordance with claim 43, wherein the focusable item contains one or more elements which are focusable or non-focusable, the cursor is on an element which is not the last element in the first direction in the item, the apparatus further comprising:

a third scroller for scrolling the display in the first direction such that a next focusable element is shown on the displayed area;

a focusable element mover for moving the cursor to a next focusable element; and a non-focusable element mover for moving the cursor to a next non-focusable element, wherein said first scroller is coupled to the display if the cursor is on a non-focusable element which end border in the first direction is not currently shown on the displayed area, wherein said third scroller and said focusable element mover are coupled to the display, if the cursor is on a non-focusable element which end border in the first direction is currently shown on the displayed area and a next element is a focusable element, or if the cursor is on a focusable element and a next element in the first direction is a focusable element not shown on the displayed area, or if the cursor is on a focusable element and the next element in the first direction is a non-focusable element which end border in the first direction is currently shown on the displayed area, wherein said focusable element mover is coupled to the display, if the cursor is on a focusable element and a next element in the first direction is a focusable element shown on the displayed area, and wherein said first scroller and said non-focusable element mover are coupled to the display, if the cursor is on a focusable element and a next element in the first direction is a non-focusable element which end border in the first direction is not currently shown on the displayed area, or if the cursor is on a non-focusable element which end border in the first direction is currently shown on the displayed area and a next element is a non-focusable element.

45. The apparatus in accordance with claim 44, wherein whenever the display is scrolled in the first direction such that the next focusable item is shown in the displayed area, the next focusable item is entirely shown in the displayed area.

46. The apparatus in accordance with claim 44, further comprising:

means for indicating a location of the cursor if the cursor is on a focusable item.

47. An apparatus for scrolling a display including one or more items, the one or more items being either focusable or non-focusable, the display having a cursor on a displayed area, no non-focusable item having a height greater than the height of the displayed area, said apparatus comprising:

means for scrolling the display in the first direction such that a next focusable item is shown in the displayed area and for moving the cursor to the next focusable item, operative unless the scrolling and the moving would cause the cursor to skip over a portion of a non-focusable item not currently shown on the displayed area; and means, operative if the scrolling and the moving would cause the cursor to skip over a portion of a non-focusable item not currently shown on the displayed area, for scrolling the display in the first direction such that the next non-focusable item is shown in the displayed area and for moving the cursor to the next non-focusable item.

48. The apparatus in accordance with claim 47, wherein whenever the display is scrolled in the first direction such that the next focusable item is shown in the displayed area, the next focusable item is entirely shown in the displayed area.

49. The apparatus in accordance with claim 47, further comprising:

means for indicating a location of the cursor if the cursor is on a focusable item.

50. An apparatus for scrolling a display including one or more items, the one or more items being either focusable or non-focusable, the display having a cursor on a displayed area, said apparatus including:

means for scrolling the display a set number of pixels in the first direction, operative if the cursor is on a non-focusable item which end border in a first direction is not currently shown on the displayed area;

means, operative if a next item is a focusable, for scrolling the display in the first direction such that the next focusable item is entirely shown on the displayed area and for moving the cursor to the next focusable item, if the cursor is currently on a non-focusable item which end border in the first direction is currently shown on the displayed area, or if the cursor is currently on a focusable item and the next focusable item is not currently shown on the displayed area;

means for moving the cursor to a next focusable item in the first direction without scrolling, operative if the cursor is currently on a focusable item and the next focusable item is currently shown on the displayed area;

means, operative if a next item is non-focusable, for scrolling the display in the first direction and for moving the cursor to the next non-focusable item, if the cursor is currently on a focusable item and an end border of the next non-focusable item in the first direction is not currently shown on the displayed area, or if the cursor is currently on a non-focusable item which end border in the first direction is currently shown on the displayed area; and means, operative if a next item is a non-focusable item which end border in the first direction is currently shown on the displayed area, for scrolling the display such that a further next item is shown in the displayed area and for moving the cursor to the further next item by skipping over the next non-focusable item.

51. A method for scrolling a display including one or more items, the one or more items being either focusable or non-focusable, the display having a cursor on a displayed area and a scroll button, said method including:

if the cursor is on a non-focusable item which end border in a first direction is not currently shown on the displayed area, scrolling the display a set number of pixels in the first direction in response to the scroll button being pressed;

if the cursor is on a non-focusable item which end border in the first direction is currently shown on the displayed area and a next item is a focusable item, scrolling the display in the first direction such that the next focusable item is entirely shown on the displayed area and moving the cursor to the next focusable item, in response to the scroll button being pressed;

if the cursor is on a focusable item and a next item in the first direction is a focusable item shown on the displayed area, moving the cursor to the next focusable item in response to the scroll button being pressed;

if the cursor is on a focusable item and a next item in the first direction is a focusable item not shown on the displayed area, scrolling the display in the first direction such that the next focusable item is shown on the displayed area and moving the cursor to the next focusable item, in response to the scroll button being pressed;

if the cursor is on a focusable item and the next item in the first direction is a non-focusable item which end border in the first direction is currently shown on the displayed area, scrolling the display in the first direction such that a next focusable item is shown on the displayed area and moving the cursor to the next focusable item, in response to the scroll button being pressed;

if the cursor is on a focusable item and a next item in the first direction is a non-focusable item which end border in the first direction is not currently shown on the displayed area, scrolling the display in the first direction and moving the cursor to the next non-focusable item, in response to the scroll button being pressed; and if the cursor is on a non-focusable item which end border in the first direction is currently shown on the displayed area and a next item is a non-focusable item, scrolling the display in the first direction and moving the cursor to the next non-focusable item, in response to the scroll button being pressed.

* * * * *